US008773850B2

(12) United States Patent
Minaguchi et al.

(10) Patent No.: US 8,773,850 B2
(45) Date of Patent: Jul. 8, 2014

(54) DOCKING STATION FOR TELEVISION RECEIVER, STAND, AND ELECTRONIC DEVICE

(75) Inventors: Hiroyuki Minaguchi, Saitama (JP); Yasuyuki Suzuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 75 days.

(21) Appl. No.: 13/476,650

(22) Filed: May 21, 2012

(65) Prior Publication Data

US 2013/0058065 A1 Mar. 7, 2013

(30) Foreign Application Priority Data

Sep. 1, 2011 (JP) ................................. 2011-191124

(51) Int. Cl.
*H05K 5/00* (2006.01)
*H05K 7/00* (2006.01)
*G06F 1/16* (2006.01)

(52) U.S. Cl.
USPC ............. 361/679.44; 361/679.41; 361/679.43

(58) Field of Classification Search
USPC .............. 361/679.41, 679.42, 679.43, 679.44
See application file for complete search history.

(56) References Cited

U.S. PATENT DOCUMENTS

| | | | | |
|---|---|---|---|---|
| 5,899,421 | A * | 5/1999 | Silverman | 248/175 |
| 6,788,527 | B2 * | 9/2004 | Doczy et al. | 361/679.11 |
| 6,856,506 | B2 * | 2/2005 | Doherty et al. | 361/679.27 |
| 6,937,468 | B2 * | 8/2005 | Lin et al. | 361/679.41 |
| 7,320,451 | B2 | 1/2008 | Ogawa | |
| 2010/0177476 | A1 * | 7/2010 | Hotelling et al. | 361/679.41 |
| 2011/0103003 | A1 * | 5/2011 | Ward et al. | 361/679.41 |

FOREIGN PATENT DOCUMENTS

| | | |
|---|---|---|
| JP | 03-058558 | 3/1991 |
| JP | 04-015876 | 2/1992 |
| JP | 10-214134 | 8/1998 |
| JP | 2001-092564 | 4/2001 |
| JP | 2003-110677 | 4/2003 |
| JP | 2003-131312 | 5/2003 |
| JP | 2005-006057 | 1/2005 |
| JP | 3130870 | 3/2007 |
| JP | 2008-015712 | 1/2008 |

OTHER PUBLICATIONS

Japanese Office Action for corresponding Japanese application 2011-191124, mailed Aug. 21, 2012, in 5 pages.

* cited by examiner

*Primary Examiner* — Anthony Haughton
(74) *Attorney, Agent, or Firm* — Knobbe, Martens, Olson & Bear LLP

(57) ABSTRACT

According to one embodiment, a docking station for a television receiver includes a support, a first connector, and a protruding portion. The support is configured to be attachably and detachably connected to a television receiver comprising a housing in which a display device is housed, and to support the housing. The first connector is configured to be electrically connected to a second connector of the television receiver. The protruding portion is configured to protrude from the support to support the support, and to enable an angle of a display screen of the display device to be set variably.

5 Claims, 27 Drawing Sheets

US 8,773,850 B2

DOCKING STATION FOR TELEVISION RECEIVER, STAND, AND ELECTRONIC DEVICE

CROSS-REFERENCE TO RELATED APPLICATIONS

This application is based upon and claims the benefit of priority from Japanese Patent Application No. 2011-191124, filed Sep. 1, 2011; the entire contents of which are incorporated herein by reference.

FIELD

Embodiments described herein relate generally to a docking station for a television receiver, a stand, and an electronic device.

BACKGROUND

Conventionally known is an add-on electronic device that is attached to the bottom surface of an electronic device to bring up an operation surface of a keyboard.

For such a device, it is desired to adjust the angle of the display screen of a display device to an appropriate angle.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
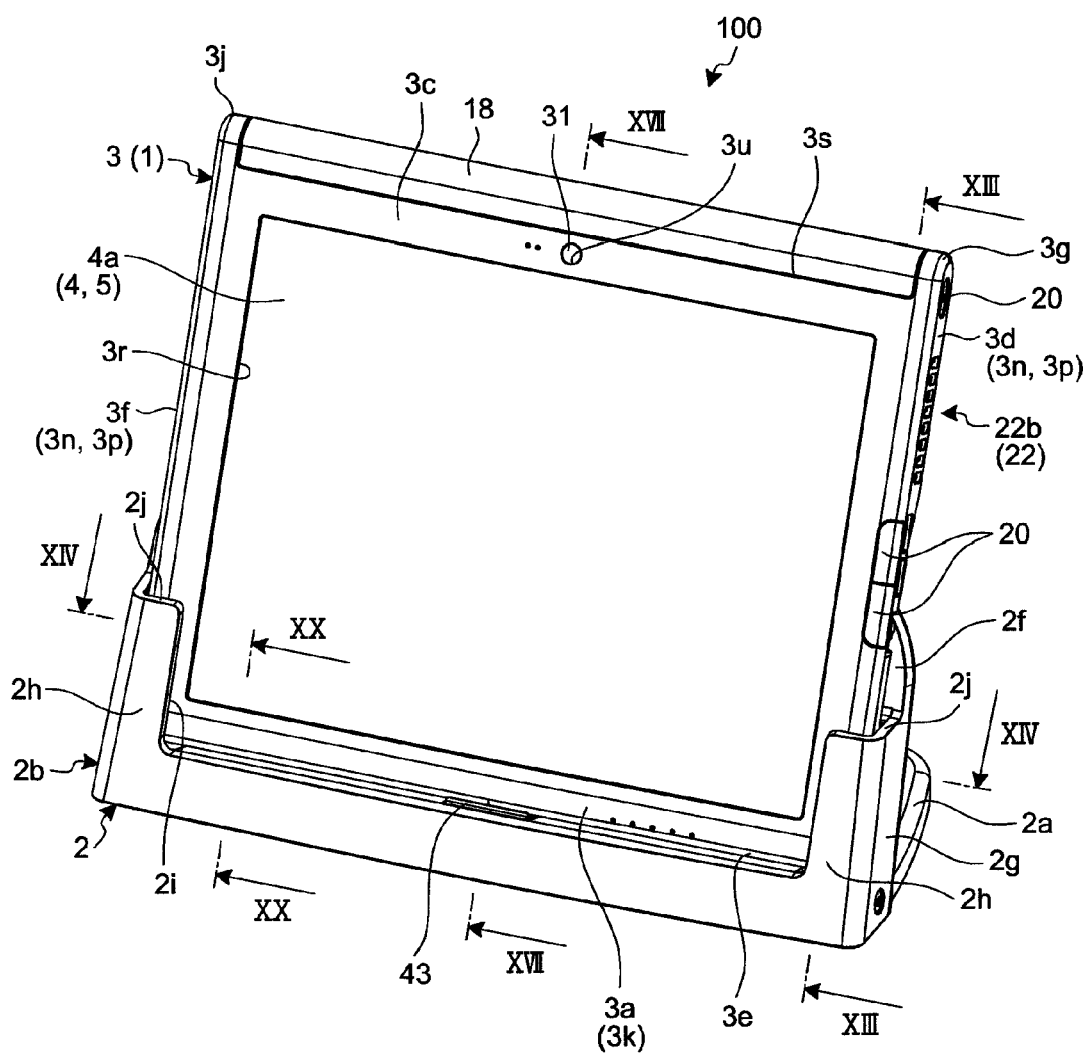
FIG. 1 is an exemplary perspective view of a television receiver held by a docking station according to a first embodiment.

In general, according to one embodiment, a docking station for a television receiver comprises a support, a first connector, and a protruding portion. The support is configured to be attachably and detachably connected to a television receiver comprising a housing in which a display device is housed, and to support the housing. The first connector is configured to be electrically connected to a second connector of the television receiver. The protruding portion is configured to protrude from the support to support the support, and to enable an angle of a display screen of the display device to be set variably.

The same elements are comprised in a plurality of exemplary embodiments described below. Therefore, in explanations below, the same reference numerals are assigned to the same elements, and redundant explanations thereof are omitted. In addition, in each of the drawings, directions (an X direction, a Y direction, and a Z direction) are illustrated for convenience. The X direction corresponds to a longitudinal direction of a display screen of a television receiver viewed from the front. The Y direction corresponds to a short side direction of the display screen viewed from the front. The Z direction corresponds to a front-back direction of the display screen (depth direction, the thickness direction of a chassis) viewed from the front. The X direction, the Y direction, and the Z direction are orthogonal with respect to each other.

In the embodiments described below, explained as an example is an electronic device configured as a television receiver, a tablet personal computer, or a slate personal computer. However, the electronic device according to the embodiments is not limited thereto. For example, the electronic device according to the embodiment can be configured as various electronic devices such as a smart phone, a smart television, a smart book, a cellular phone, a personal digital assistant (PDA), a video display device, and a video phone.

In a first embodiment, as an example, as illustrated in FIG. 1, a television system (electronic device system) 100 comprises a television receiver 1 that is an example of the electronic device mounted on a docking station 2 that is an example of a support. In the first embodiment, by connecting the television receiver (electronic device) 1 to the docking station 2 (support), the docking station 2 can add a function not included in the television receiver 1, or expanding or increasing the functions included in the television receiver 1, such as adding a connector for the television receiver 1, that is, a connector that is to be electrically connected to a circuit and the like included in the television receiver 1, or increasing a number of such connectors, for example. In other words, the docking station 2 (support) is an example of a function expanding apparatus that is compatible with the television receiver (electronic device) 1.

The docking station 2 supports a housing 3 of the television receiver 1 in which a display device 4 is housed. In other words, the docking station 2 is an example of a supporting apparatus (supporting stand, stand) for the television receiver 1. The docking station 2 comprises a mechanism (not illustrated in FIG. 1) for enabling the angle of a display screen 4a of the display device 4 to be adjusted. In other words, the docking station 2 is an example of an angle adjusting apparatus for the display screen 4a (the housing 3 in which the display device 4 is enclosed).

Figure 2:
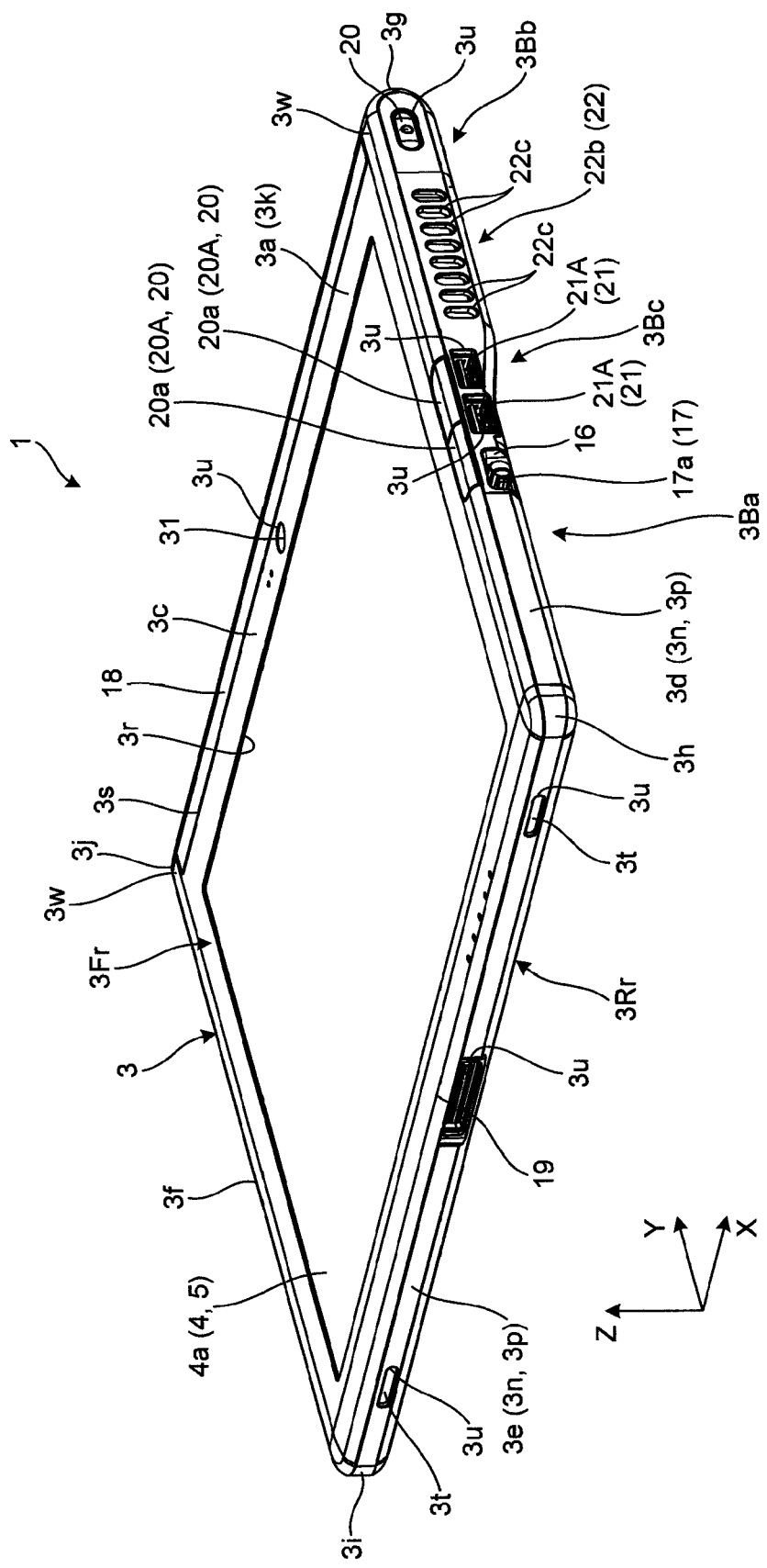
FIG. 2 is an exemplary perspective view of the television receiver in the embodiment.
Figure 3:
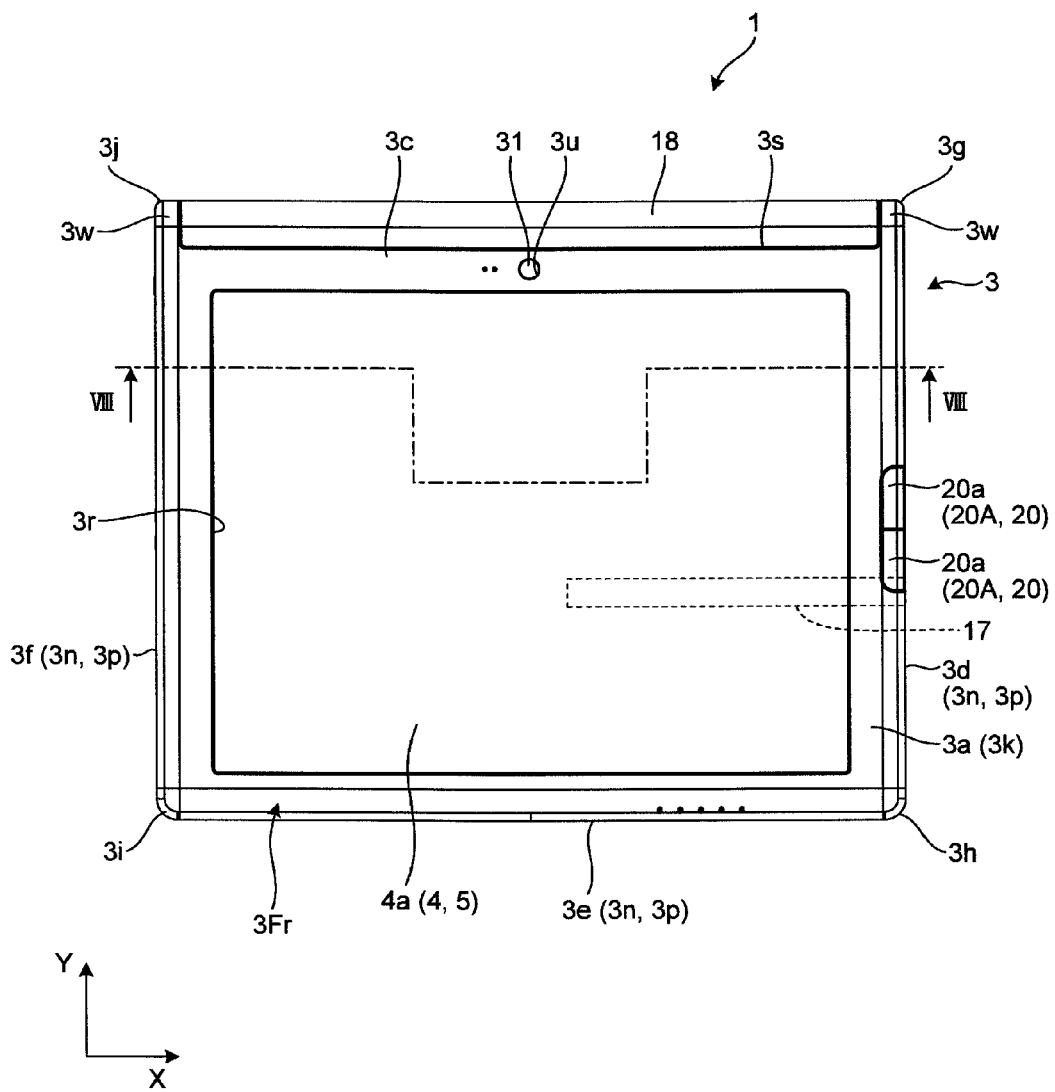
FIG. 3 is an exemplary front view of the television receiver in the first embodiment.
Figure 4:
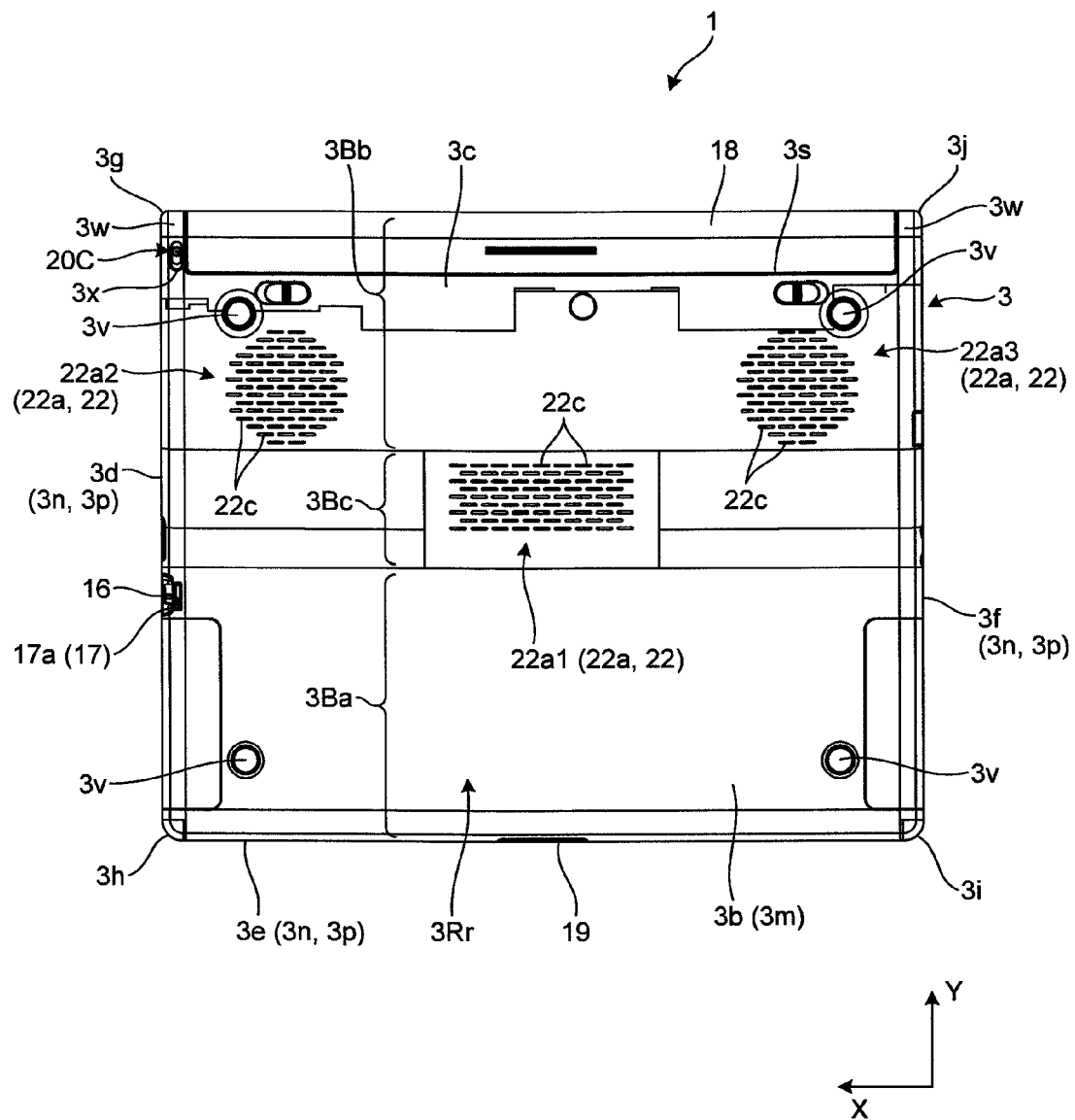
FIG. 4 is an exemplary rear view of the television receiver in the first embodiment.
Figure 5:
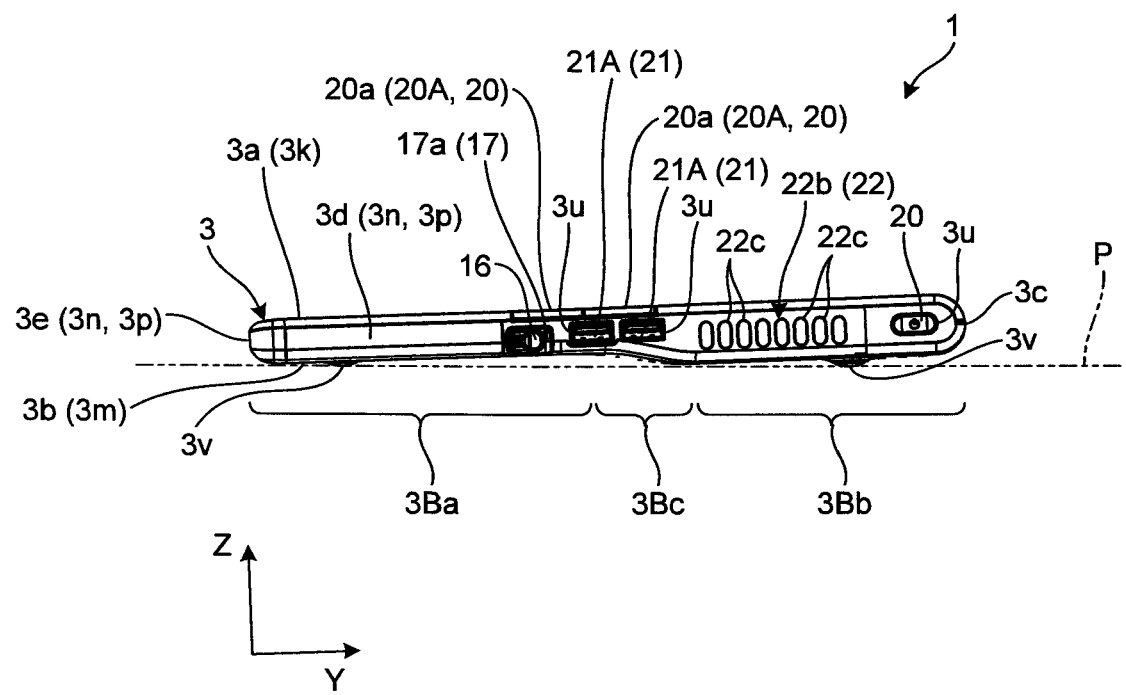
FIG. 5 is an exemplary side view of the television receiver in the first embodiment.

In the first embodiment, as an example, as illustrated in FIGS. 1 to 4, the housing 3 of the television receiver 1, is configured in a rectangular shape (in the first embodiment, an oblong shape, as an example) viewed from the front and viewed from the rear. In the first embodiment, as an example, the housing 3 has a shape of a flat parallelepiped that is thin in the front-back direction as illustrated in FIGS. 2 and 5. The housing 3 comprises a front surface (frontal surface, face, first surface, first surface section) 3a and a rear surface (back surface, face, second surface, second surface section) 3b that is on the opposite side of the front surface 3a. The front surface 3a and the rear surface 3b are laid approximately in parallel. The housing 3 comprises four ends (side portions, edge portions) 3c to 3f and four corners (pointed portions, curved portions, ends) 3g to 3j viewed from the front, as illustrated in FIGS. 2 to 4. The ends 3c and 3e are examples of longer sides. The ends 3d and 3f are examples of shorter sides.

The housing 3 also comprises a wall portion (first wall portion, first portion, plate, frame, front wall portion, frontal wall portion, top wall portion) 3k including the front surface 3a, and a wall portion (second wall portion, second portion, plate, rear wall portion, back wall portion, bottom wall portion) 3m including the rear surface 3b. Each of the wall portions 3k and 3m is in a rectangular shape (in the first embodiment, an oblong shape, as an example). The housing 3 also comprises four wall portions (third wall portions, third parts, plates, side wall portions, end wall portions, standing wall portions, stretched portions) 3n laid across and between the wall portion 3k and the wall portion 3m including side surfaces (surface, circumferential surface, third surface) 3p. An opening 3r that is rectangular in shape is disposed on the wall portion 3k, as an example.

Figure 6:
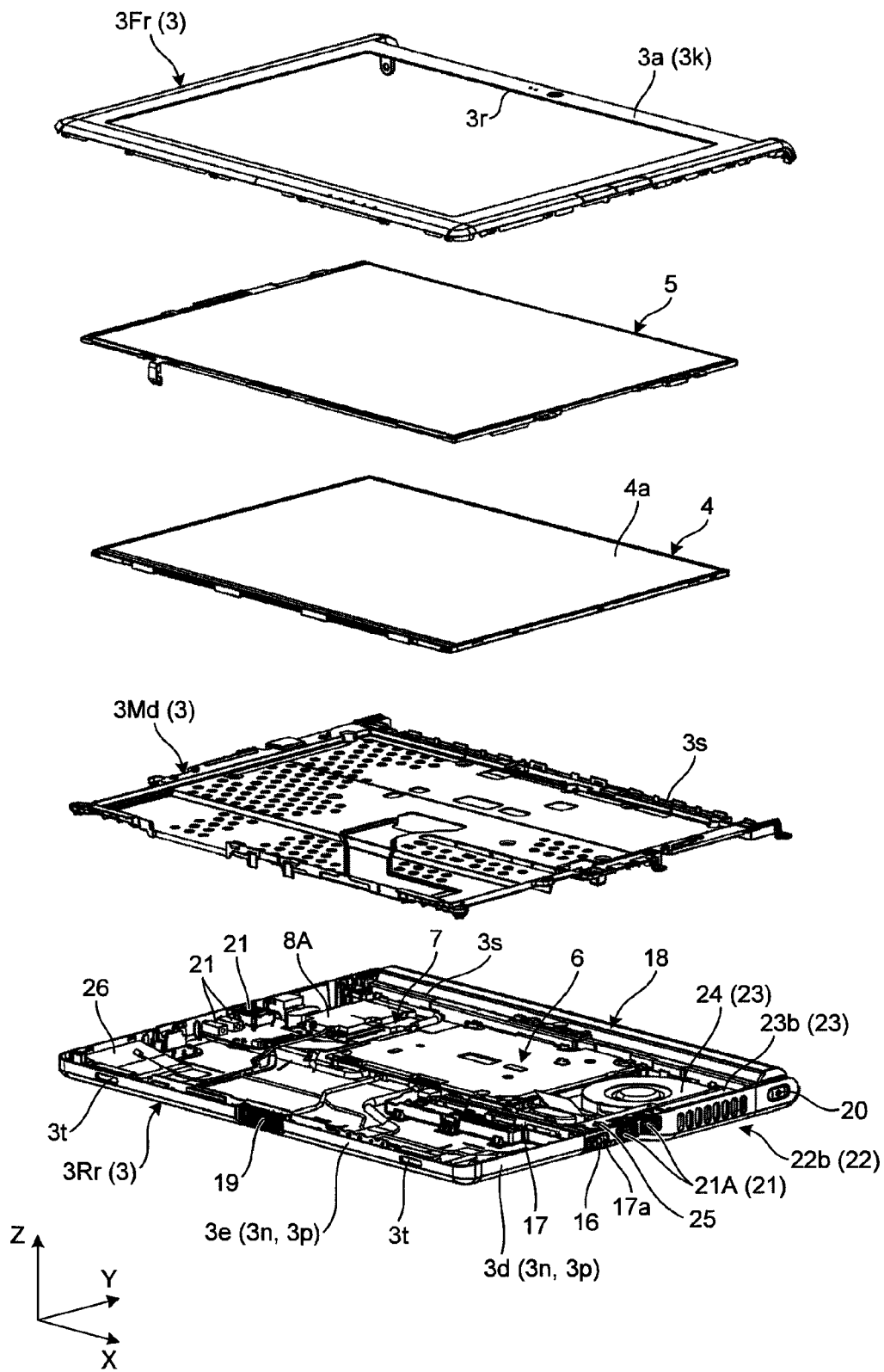
FIG. 6 is an exemplary exploded perspective view of the television receiver in the first embodiment.
Figure 8:
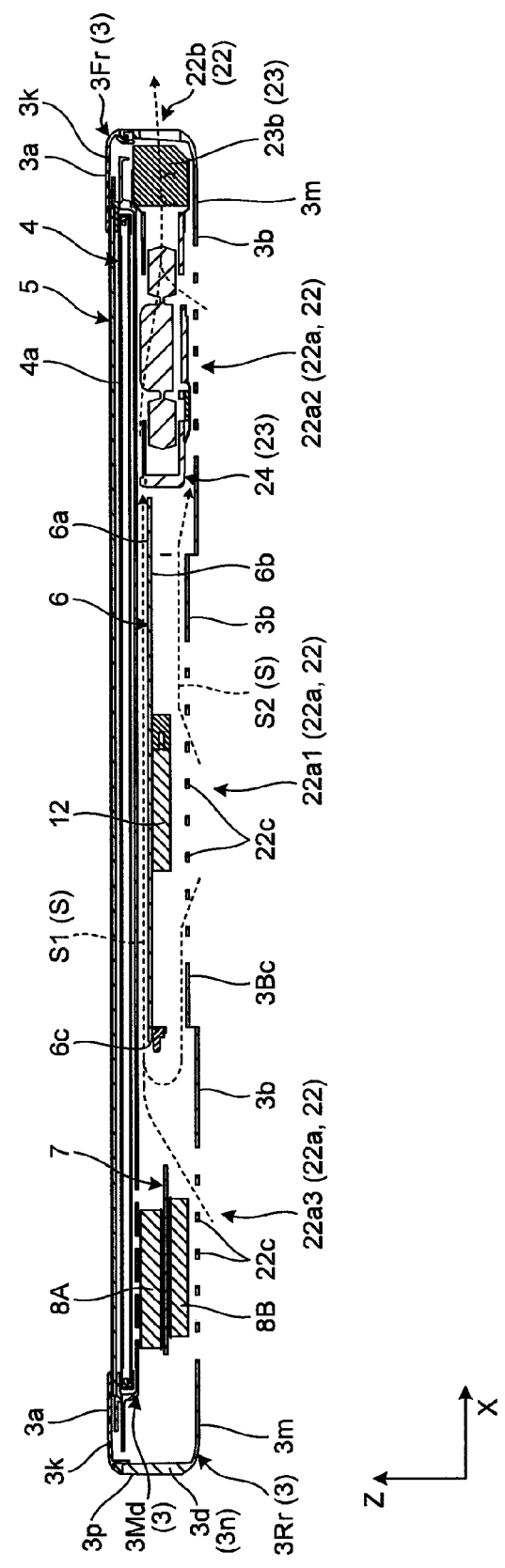
FIG. 8 is an exemplary cross sectional view of the television receiver taken along the line VIII-VIII of FIG. 3, in the first embodiment.

The housing 3 can be structured as a combination of a plurality of components (divided bodies). In the first embodiment, as an example, the housing 3 comprises a first member (first portion, front side member, cover) 3Fr at least including the wall portion 3k, and a second member (second portion, rear side member, base, bottom) 3Rr at least including the wall portion 3m. Each of the wall portions 3n is included in at least one of the first member 3Fr and the second member 3Rr (for example, the second member 3Rr). In the first embodiment, as illustrated in FIGS. 6 and 8, the housing 3 also comprises, in addition to the first member 3Fr and the second member 3Rr, a third member (third portion, intermediate member, isolating member, barrier member, wall portion member, interposed member, inner plate, middle plate, middle frame) 3Md placed between the first member 3Fr and the second member 3Rr. A part of the wall portions 3n can be included in the third member 3Md as well. The housing 3 can be made of a metallic material or a synthetic resin material, for example. As an example, the second member 3Rr and the third member 3Md may be made of a material of relatively high stiffness (for example, a metallic material such as magnesium alloy), and the first member 3Fr can be made of a material of relatively low stiffness (a material less stiffer than the second member 3Rr and the third member 3Md; a synthetic resin material, for example). The first member 3Fr, the second member 3Rr, and the third member 3Md can comprise wall portions (protruding portions, protruding wall portions) such as ribs. Such wall portions tend to increase the stiffness of the housing 3. The third member 3Md can comprise openings such as through-holes. Such openings enable the housing 3 to be more light-weighted.

In the first embodiment, as an example, as illustrated in FIG. 5, the thickness of a first section 3Ba coming to the bottom or coming to the front side (the side nearer to the user) in a use position in which the longitudinal direction is laid horizontally is smaller than the thickness of a second section 3Bb coming to the top or coming to the rear side (the side away from the user) in the use position. Therefore, when the television receiver 1 is placed on a setting surface P such as a desk and used, the height of the front surface 3a of the housing 3 and the display screen 4a from the setting surface (horizontal surface) P increases from the front side (bottom) toward the rear side (top). Therefore, according to the first embodiment, as an example, the display screen 4a is positioned at a so-called inclined position in view of a user located on the left side of the television receiver 1 in FIG. 5, and, for the user, the display screen 4a is easier to see, advantageously. The angle between the display screen 4a and the setting surface P (the obtuse angle side) in the position illustrated in FIG. 5 can be equal to or more than 135 degrees and less than 180 degrees. In the first embodiment, as an example, a plurality of protruding portions 3v (3v, 3v) are provided on the rear surface 3b of the housing 3. As it may be understood from FIG. 5, the distance between the display screen 4a and the tip of the protruding portion 3v arranged on the second section 3Bb on the right side of FIG. 5 is longer than the distance between the display screen 4a and the tip of the protruding portion 3v arranged on the first section 3Ba on the left side of FIG. 5. In the first embodiment, the protruding portion 3v (the tip of the protruding portion 3v) on the left side of FIG. 5 is an example of a first contacting portion, and the protruding portion 3v (the tip of the protruding portion 3v) illustrated in the right side in FIG. 5 is an example of a second contacting portion.

The housing 3 also comprises a component receptacle 17 for holding a component 16 in a removable manner. In the first embodiment, as an example, an opening 17a of the component receptacle 17 opens to the end 3d. The opening 17a is provided on the end 3d coming to the top in one of use positions (first posture or second posture, in the example explained above) and not coming to the bottom in a non-use position. Such an arrangement allows the opening 17a to come to the top in the use position. Therefore, as an example, the component 16 is better prevented from falling out of the component receptacle 17 by the action of the gravity. The component 16 is, specifically, a stylus, a stylus pen, or a pen, for example.

In the first embodiment, as an example, as illustrated in FIG. 3, a battery 18 and the display device 4 are not placed on top of each other in the thickness direction of the housing 3, but are arranged side by side along a direction perpendicular to the thickness direction (the direction along the front surface 3a or the rear surface 3b, the X direction or the Y direction; along the Y direction in the first embodiment, as an example). Therefore, as an example, the thickness of the housing 3 can be further reduced compared with an arrangement in which the battery 18 and the display device 4 are placed on top of each other in the thickness direction of the housing 3. Furthermore, as an example, the thickness of the battery 18 can be further increased compared with an arrangement in which the battery 18 and the display device 4 are placed on top of each other in the thickness direction of the housing 3. Therefore, the per-volume capacitance of the battery 18 can be increased easily. In the first embodiment, the housing 3 comprises the first section 3Ba having a smaller thickness, and the second section 3Bb having a larger thickness, as illustrated in FIG. 5. A battery housing (battery support) 3s for housing the battery 18 is disposed along the end 3c of the second section 3Bb having a larger thickness. Therefore, as an example, the thickness of the battery 18 can be increased more easily compared with an arrangement in which the battery housing is disposed in the first section 3Ba. Therefore, the per-volume capacitance of the battery 18 can be increased easily.

Furthermore, in the first embodiment, as an example, the end 3e located opposite the end 3c which has the battery housing is supported by the docking station 2. Therefore, as an example, a worker (e.g., a user) can attach or remove the battery 18 to or from the housing 3 while the television receiver 1 is supported by the docking station 2. Furthermore, a connector 19 to be connected to a connector 43 on the docking station 2 (see FIGS. 10 and 11, for example) is provided on the end 3e, as illustrated in FIGS. 2 and 3. Therefore, as an example, the battery housing and the connector 19 can be included in the housing 3 easily without interrupting each other. A speaker cover 3t is also exposed from the end 3e. The connector 19 and the speaker cover 3t are respectively exposed through openings 3u that are provided on the wall portion 3n laid along the end 3e. The connector 19 is an example of a first connector.

Furthermore, in the first embodiment, as an example, operating modules 20 and connectors 21 are provided on the front surface 3a or the side surface 3p of the housing 3, as illustrated in FIGS. 2, 3, 5, and 6. The operating modules 20 can be a push button, a push switch, a sliding switch, or a pointing device, for example. The connectors 21 are a connector for a power cable, a universal serial bus (USB) connector, and a connector for a headset or a microphone, for example. The operating modules 20 and the connectors 21 are respectively exposed through the openings 3u that are provided on the wall portions 3k and 3n on the housing 3. Furthermore, a camera (camera module, imaging apparatus) 31 can be disposed on the front surface 3a.

Furthermore, in the first embodiment, as an example, vent holes 22 through which the air for cooling electronic components 12 (see FIG. 8, for example) is collected and discharged are provided on the rear surface 3b and the side surface 3p of the housing 3 as illustrated in FIGS. 2, 4 to 6, and 8. In the first embodiment, as an example, inlets 22a through which the air is collected are provided on the rear surface 3b (the wall portion 3m), and an outlet 22b through which the air is discharged is provided on the side surface 3p (the wall portion 3n, the end 3d). In the first embodiment, each of the inlets 22a and the outlet 22b is formed as a collection of a plurality of small holes 22c provided on each of the wall portions 3m and 3n. Because the protruding portions 3v are provided on the rear surface 3b, even if the rear surface 3b is placed on the setting surface P as illustrated in FIG. 5, the inlets 22a are not blocked. Furthermore, in the first embodiment, a tilted section 3Bc is provided at a boundary area between the thin first section 3Ba and the thick second section 3Bb of the housing 3. An inlet 22a1 that is one of the inlets 22a is provided on the rear surface 3b of the tilted section 3Bc, as illustrated in FIG. 4. Because the distance between the tilted section 3Bc and the setting surface P is larger than the distance between other parts and the setting surface P, as illustrated in FIG. 5, the flow resistance of the air at the inlet 22a1 provided on the tilted section 3Bc can be better reduced easily, and therefore, the cooling efficiency can further be increased easily. Furthermore, in the first embodiment, because the inlet 22a is provided in plurality, even if any one of the inlets 22a is blocked for some reason, as an example, the air can be collected through the other inlets 22a into the housing 3. Therefore, the cooling performance is not lost easily. The housing 3 may be cooled by a cooling mechanism 23 (see FIGS. 7 and 8, for example), or may be naturally cooled (by convection cooling).

In the first embodiment, as an example, the display device (display module, display, panel) 4 is housed between the first member 3Fr and the third member 3Md, as illustrated in FIGS. 6 and 8. The display screen 4a facing the front surface 3a of the display device 4 is exposed through the opening 3r to the front side (outside) of the housing 3. Therefore, a user can see the display screen 4a through the opening 3r from the front side. The display device 4 is in a rectangular shape (in the first embodiment, an oblong shape, as an example) viewed from the front. Furthermore, the display device 4 is in a flat parallelepiped shape, being thin in the front-back direction. The display device 4 is a liquid crystal display (LCD) or an organic electro-luminescent display (GELD), for example.

Furthermore, in the first embodiment, as an example, an input operation panel (touch panel, touch sensor, operation panel, as an example) 5 that is transparent, relatively thin, and rectangular in shape is provided on the front side (frontal side, the side of the wall portion 3k) of the display device 4. The input operation panel 5 covers the display screen 4a. An operator (e.g., a user) can perform an inputting process by performing an operation, such as touching, pressing, or rubbing, on the input operation panel 5 using a hand, a finger, the component 16 (stylus), and the like, or moving a hand, a finger, a stylus, and the like near the input operation panel 5. Furthermore, the light output from the display screen 4a of the display device 4 passes through the input operation panel 5, and is emitted toward the front side (outer side) of the housing 3 through the opening 3r on the wall portion 3k. The input operation panel 5 is an example of an input module.

In the first embodiment, as an example, a plurality of boards 6, 7, and 25 are installed on the rear side of the display device 4 (back side, behind side, the side near the wall portion 3m, the side opposite to the display screen 4a). In the first embodiment, as an example, the boards 6, 7, and 25 are installed between the second member 3Rr and the third member 3Md in the housing 3, as illustrated in FIG. 6. The boards 6, 7, and 25 are placed at positions different from each other, and are laid in parallel with the display device 4. Furthermore, the boards 6, 7, and 25 are provided in a manner separated from the wall portions 3k, 3m, and 3n, for example, that is, provided so that a space is formed between the boards and the wall portions 3k, 3m, and 3n, for example. The boards 6, 7, and 25 are provided side by side along the display device 4, so as not to be placed on top of each other in the thickness direction of the housing 3. The boards 6, 7, and 25 are also fixed to the housing 3 with fasteners such as screws.

Furthermore, in the first embodiment, as an example, the electronic components 12 provided in plurality (see FIG. 8; only partially illustrated in FIG. 8) such as a central processing unit (CPU), a graphic controller, a power circuit component, a platform controller hub (PCH), a memory slot connector, an LCD connector, an input/output (I/O) connector, a power coil, an element, a connector, and the like can be implemented on the board (first board, first circuit board, control board, main board) 6. The electronic components 12 comprise heating elements. The electronic component (heating element) 12 that generates a large amount of heat can have the cooling mechanism 23. The cooling mechanism 23 comprises a heat sink (heat receiving module, not illustrated), a heat pipe 23a, a heat dissipating module 23b, and a fan 24. The board 6 and the electronic components 12 make up at least a part of a controlling circuit (not illustrated). The controlling circuit can comprise a video signal processing circuit, a tuner, a high-definition multimedia interface (HDMI) signal processor, an audio video (AV) input terminal, a remote controller signal receiver, a controller, a selector, an on-screen display interface, a storage module (e.g., a read-only memory (ROM), a random access memory (RAM), a hard disk drive (HDD), and a solid state drive (SSD)), and a voice signal processing circuit. The controlling circuit controls video outputs (e.g., moving images or still images) from the display screen 4a of the display device 4, sound outputs from a speaker (not illustrated), and light emissions from a light emitting diode (LED) (not illustrated). The display device 4, the speaker, the LED, and the like are examples of an output module.

Furthermore, in the first embodiment, as an example, as it may be understood from FIGS. 3, 4, and 8, the boards 6 and 7, and the cooling mechanism 23 are disposed in the second section 3Bb having a larger thickness in the housing 3. Therefore, as an example, a larger space can be ensured compared with a structure in which the boards 6 and 7, and the cooling mechanism 23 are disposed in the first section 3Ba having a smaller thickness. Therefore, the cooling effect achieved by the air flow caused to flow by the fan 24 of the cooling mechanism 23 can be obtained easily. Furthermore, in the first embodiment, as an example, the fan 24 and the heat dissipator 23b are disposed at the corner 3g where the end 3c and the end 3d meet and that come to the top in a specified (controlled) use position. Therefore, as an example, the fan 24 and the heat dissipator 23b can be positioned to the upper side of the housing 3 regardless of the use position of the television receiver 1. Therefore, as an example, less heat stays in the housing 3. The fan 24 and the heat dissipator 23b are provided at positions adjacent to the outlet 22b.

Furthermore, in the first embodiment, as an example, the board 7 is disposed at a position interposing the board 6 with the cooling mechanism 23 (a position arranged in the order of the board 7, the board 6, and the cooling mechanism 23 in the second section 3Bb). This arrangement enables the air sucked from outside to hit the board 7 before reaching the position of the board 6. Therefore, as an example, the heat dissipating efficiency of the board 7 can be increased easily. Furthermore, among the components housed in the housing 3, the board 7 on which modules 8A and 8B are implemented and that is relatively heavy is located on the opposite side of the cooling mechanism 23 that is another heavy object with respect to the board 6 that is disposed at the center of the housing 3. Therefore, as an example, the weight balance of the television receiver 1 can be further improved. Therefore, as an example, when a user carries the television receiver 1, the user can handle more easily.

Furthermore, in the first embodiment, as an example, the wall portion 3m of the housing 3 comprises an inlet 22a2 arranged near the fan 24, an inlet 22a3 arranged on the opposite side of the inlet 22a2 with respect to the board 6, and the inlet 22a1 arranged nearer to the electronic components 12, which is a heating element, than the inlets 22a2 and 22a3, as illustrated in FIGS. 4 and 8. By providing the inlet 22a2, the air flow is permitted to flow through the housing 3 more efficiently. Furthermore, an air flow S collected through the inlet 22a3 is divided into an air flow S2 flowing toward the fan 24 along a second surface 6b that is the rear surface of the board 6, and an air flow S1 flowing by passing through outside (flowing around, bypassing) an end 6c of the board 6 located opposite side of the fan 24 along a first surface 6a that is the front side of the board 6 toward the fan 24. Therefore, it is possible to cool the electronic components (heating elements) 12 implemented on both sides of the first surface 6a and the second surface 6b of the board 6.

Furthermore, in the first embodiment, as an example, as illustrated in FIG. 8, the board 7 and the modules 8A and 8B are laid along the display device 4. Furthermore, the electronic components 12 are implemented on the board 25. A flexible cable 27 is also housed in the housing 3. The flexible cable 27 electrically connects the boards 6, 7, and 25, the display device 4, the connector 19, and the like. The flexible cable 27 is, for example, a flexible printed wiring board or a flat cable.

Figure 7:
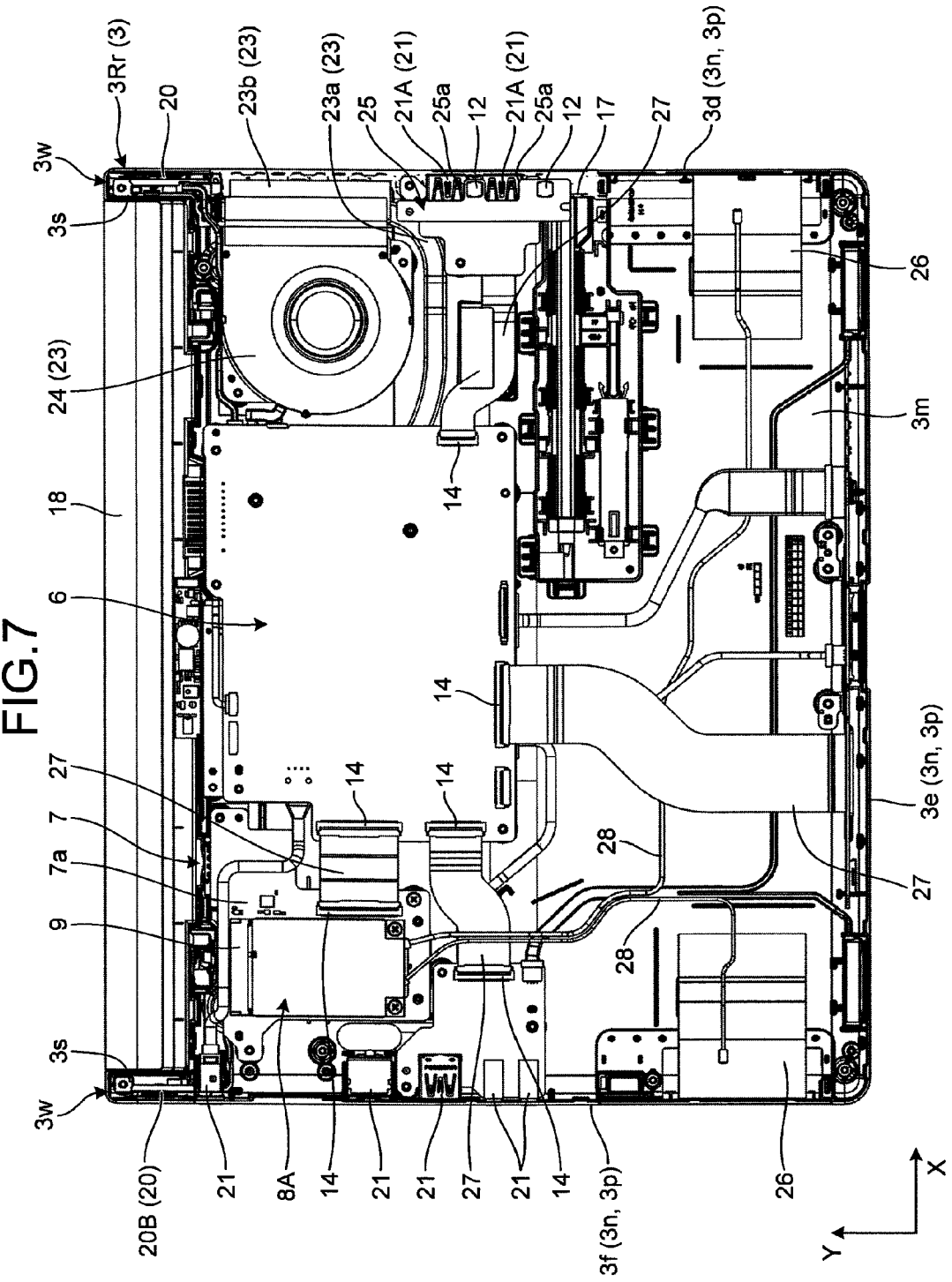
FIG. 7 is an exemplary plan view of an internal structure of the television receiver in the first embodiment.

A plurality of antennas 26 is also housed in the housing 3, as illustrated in FIG. 7. In the first embodiment, the antennas 26 connected to a communication module (for example, the module 8B) are provided in a manner separated from each other. In the first embodiment, as an example, one of the antennas 26 is disposed near the end 3d and the end 3e (near the corner 3h) of the housing 3, and the other antenna 26 is disposed near the end 3e and the end 3f (near the corner 3i) of the housing 3. In this manner, as an example, the space diversity of the antennas 26 can be realized. The antennas 26 and the module 8B are electrically connected via a cable 28. Functions can be divided between the antennas 26 and 26, e.g., using one of the antennas 26 for transmissions and receptions, and using the other antenna 26 only for transmissions. Alternatively, one of the antennas 26 can be used as a backup of the other antenna 26.

Figure 9:
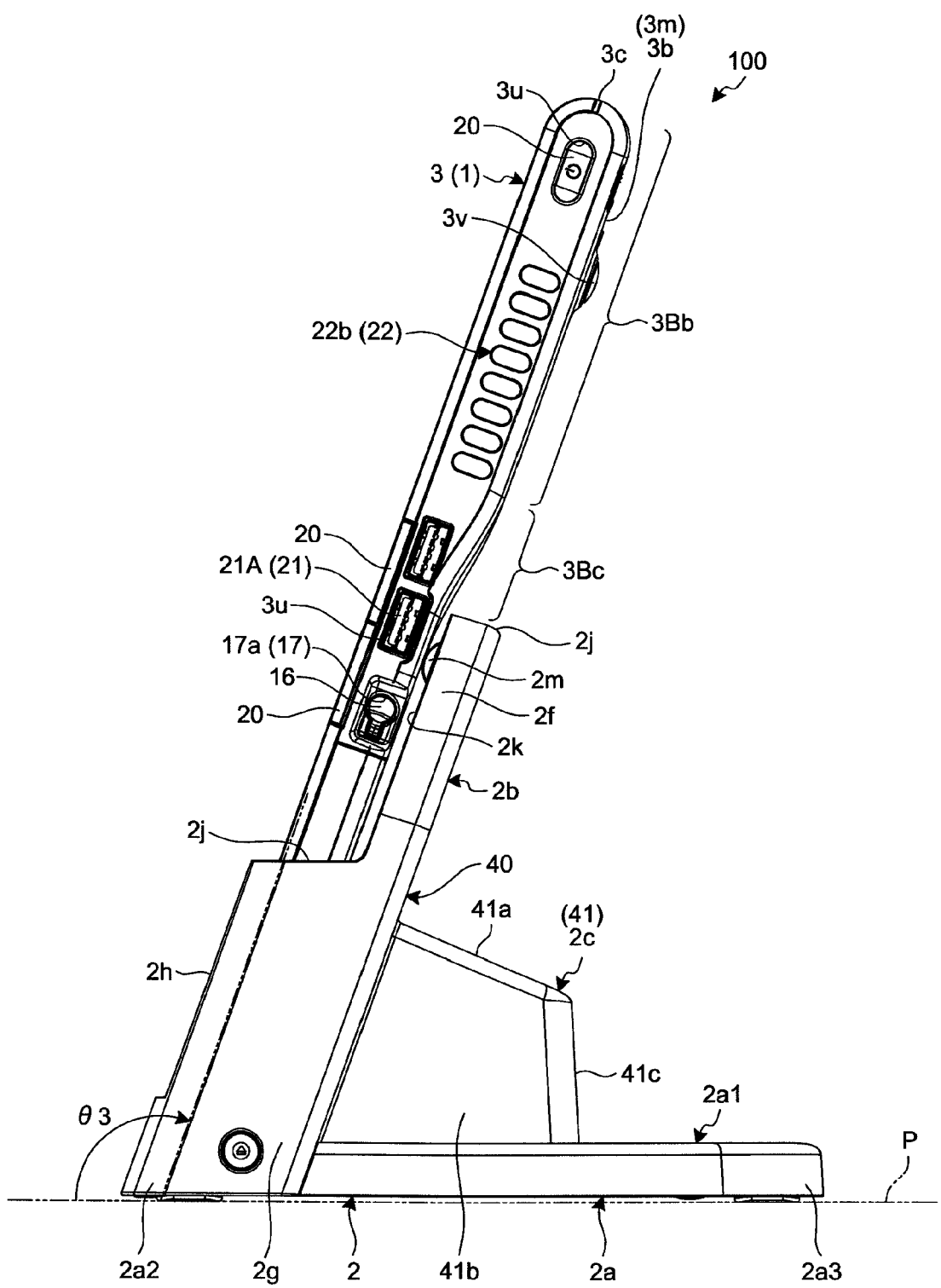
FIG. 9 is an exemplary side view of the television receiver held by the docking station in the first embodiment.

In the first embodiment, as an example, the docking station 2 comprises a first support 2a and a second support 2b, as illustrated in FIG. 9. The first support 2a is placed on the setting surface P (see FIG. 9), and functions as a platform (platform portion, bottom portion, lower portion, foundation portion, base, base portion, mounting portion, foot portion, foot, falling preventing portion, preventing portion). The second support 2b protrudes from (the bottom part of) the first support 2a upwardly of the setting surface P, and holds the housing 3 of the television receiver 1 at predetermined posture (position). In other words, the second support 2b functions as a holding portion (standing portion, vertical portion, upper portion, receive portion, maintaining portion, covering portion, abutting portion, contacting portion, guiding portion). The first support 2a and the second support 2b do not have to be clearly divided as separate components, and may be parts of a component. In the first embodiment, as an example, the docking station 2 also comprises a protruding portion 2c that is arranged between the first support 2a and the second support 2b, and protrudes upwardly from the first support 2a and backwardly from the second support 2b. The protruding portion 2c has a function of a component housing 41 for housing components, as well as a support for supporting the second support 2b by being interposed between the first support 2a and the second support 2b. The docking station 2, the first support 2a, the second support 2b, and the protruding portion 2c are examples of a support that supports the television receiver (electronic device) 1. The first support 2a, the second support 2b, and the protruding portion 2c can be realized in various specifications (e.g., shapes, structures, and number). The docking station 2 is electrically and mechanically connected to the television receiver (electronic device) 1 positioned at a predetermined position (mounted position, holding position, placed position) of the docking station 2.

The docking station 2 can provide various functions related to the television receiver (electronic device) 1 mounted on the docking station 2. The docking station 2 can function as a stand for keeping the display screen 4a standing, for example. In such a case, the docking station 2 can have a function of setting the angle of the display screen 4a (the posture of the television receiver 1) variably. This will be described later. The docking station 2 can also function as a charger for the television receiver 1, for example. In such a case, the docking station 2 can function as a charger that is electrically connected to the television receiver 1 over a wire, or can function as a charger that performs non-contact charging (wireless charging). In such a case, a non-contact charging module is included in the second support 2b, as an example. The docking station 2 can also function as a connector (a hub for connectors, a device for relaying data, signals, and the like) that increases the number of connectors that are electrically connected the television receiver 1, for example. The docking station 2 can also function as a speaker of the television receiver 1, for example. The docking station 2 can also have, for example, a cooling function for the television receiver 1. In such a case, as an example, a ventilation channel, a fan, and the like are installed in a housing 40 of the docking station 2, and the docking station 2 can facilitate or promote cooling of the television receiver 1 by means of the air passing through the ventilation channel. The ventilation channel can have an opening facing the vent hole 22 on the television receiver 1. The docking station 2 also may have a cooling module facing the television receiver 1, as an example. The docking station 2 can also have a function of an alternating current (AC) adapter, for example.

Furthermore, in the first embodiment, as an example, the docking station 2 has, at least partially, a hollow structure. The docking station 2 comprises the housing 40. At least a part of various components such as boards 42A and 42B (see FIGS. 17 and 18), connectors 43 and 44, electronic components 45, and a harness 46 are housed in the housing 40. The housing 40 can be made of a synthetic resin material or a metallic material (a synthetic resin material in the first embodiment, as an example). Furthermore, in the first embodiment, as an example, a frame (frame member, backbone member, highly stiff member, stiff member, strong member) 47 (see FIG. 16, for example) is installed in the housing 40. The frame 47 can be made of a metallic material or a synthetic resin material (in the first embodiment, a metallic material, as an example). The connector 43 is an example of a second connector. In the first embodiment, as an example, the board 42B, the connector 44, the electronic components 45, and the like implemented on the board 42B are housed in the component housing 41 that is a part of the housing 40 and is structured as the protruding portion 2c.

In the first embodiment, as an example, the first support 2a is thin in a side view along the setting surface P (the line of sight illustrated in FIG. 9), and has an appearance of a rectangular shape (trapezoidal shape) in a plan view in perpendicular to the setting surface P, and has a flat shape (plate-like, wall-like) along the setting surface P, as illustrated in FIGS. 9 to 12. In the first embodiment, as an example, the second support 2b protrudes in a direction slightly inclined backwardly from the vertical direction of an end 2a2 of the first support 2a (toward the rear side with the television receiver 1 mounted, the side nearer to an end 2a3 located on the opposite side of the end 2a2). The second support 2b keeps (supports, maintains, holds) a part of one end of the housing 3 of the television receiver 1 (in the first embodiment, the end 3e, as an example) from directions excluding the direction (in the first embodiment, upward direction, as an example) in which the television receiver 1 is mounted on (inserted to) the predetermined position (holding position, held area), in other words, from the bottom, the backward, and the sideward directions (the left side and the right side), and in a manner surrounding (covering) the end of the housing 3 from the front side, as illustrated in FIGS. 9 to 14. The part along the end 3e (see FIGS. 2 and 3) can also be covered by the second support 2b. The second support 2b also functions as a guide for guiding the housing 3 of the television receiver 1 to a predetermined position when the television receiver 1 is moved (slid, displaced, inserted, mounted) to the predetermined position of the docking station 2. In other words, the second support 2b is an example of a guiding portion (guide portion, slide portion, sliding portion). In the first embodiment, as an example, the second support 2b comprises wall portions 2e to 2h. The wall portion (first wall, first wall portion, bottom wall portion, lower wall portion) 2e is located under the housing 3 held at the predetermined position, and covers the housing 3 from the bottom. The wall portion (second wall, second wall portion, rear wall portion, back wall portion) 2f is located behind the housing 3, and covers the housing 3 from behind (rear side, rear surface side, back surface side, behind side). The wall portions (third wall, third wall portion, side wall portion) 2g are located on the side of the housing 3, and covers the housing 3 from the lateral directions. The wall portion (fourth wall, fourth wall portion, front wall portion) 2h is located in front of the housing 3, and covers the housing 3 from the front side. The wall portion 2e can be configured as a part of the first support 2a.

Figure 11:
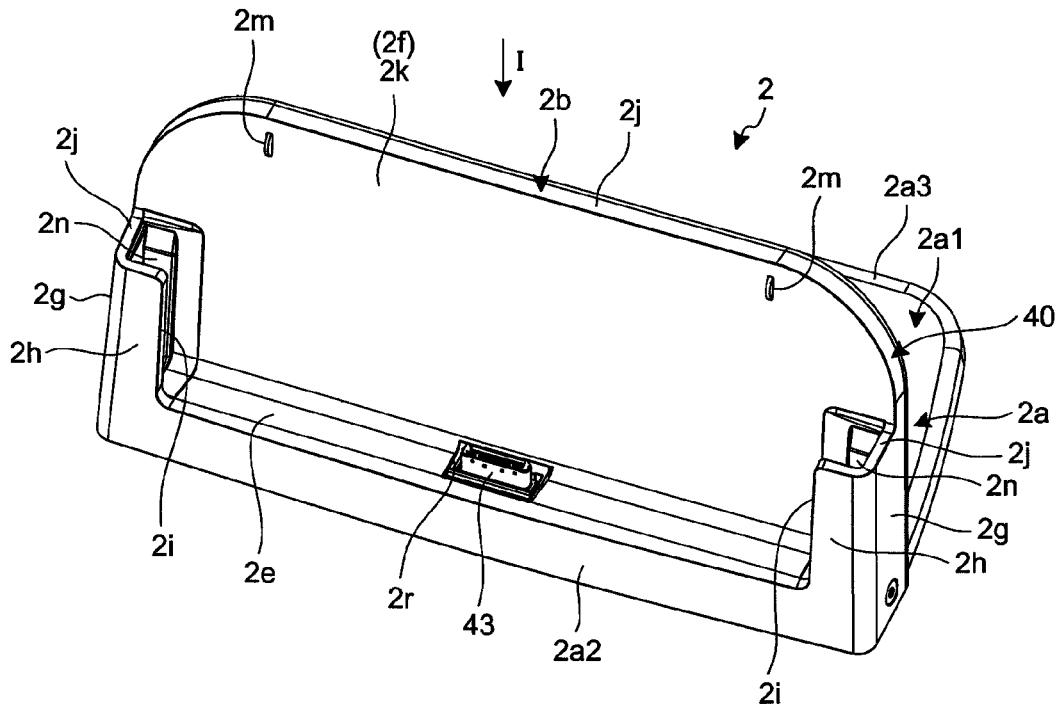
FIG. 11 is an exemplary perspective view of a docking station as viewed from above, in the first embodiment.

Furthermore, in the first embodiment, as an example, the docking station 2 covers the television receiver 1 in a manner exposing the functioning parts of the television receiver (electronic device) 1, or in a manner communicating the functioning parts to the perimeter of the docking station 2. As an example, in the first embodiment, the second support 2b comprises an opening 2i in a manner corresponding to the front side of the television receiver 1, as illustrated in FIGS. 1 and 11. The opening 2i can be configured as a cutout portion or a through-hole, for example (in the first embodiment, a cutout portion, as an example). In other words, in the first embodiment, in a posture where the television receiver 1 is mounted on the docking station 2, the parts that are laid along the ends 3d and 3f, located on the right and the left sides of the front surface 3a of the housing 3, and that are not matched with the display screen 4a and the opening 3r are covered by (the wall portion 2h of) the second support 2b. Such an arrangement can better ensure the visibility of the display screen 4a, as an example. The end 3e, which is located at the bottom of the front surface 3a of the housing 3, may be covered by a covering member (for example, a part of the second support 2b, the first support 2a, or the housing 40, or a separate member that is not the housing 40).

In the first embodiment, as an example, the docking station 2 holds the television receiver 1 in a state in which the vent holes 22 provided on the housing 3 of the television receiver 1 are exposed. As illustrated in FIGS. 2, 4, and 5, the vent holes 22 are provided on the second section 3Bb and the tilted section 3Bc of the housing 3, respectively. As it may be understood from FIGS. 1, 9, and 10, each of the vent holes 22 is located at a position higher than an upper end (edge portion, side portion) 2j of each of the portions of the second support 2b, and is exposed without being covered by the docking station 2. Therefore, as an example, the air (air flow) flowing through the vent holes 22 is less interrupted by the docking station 2. The openings 3u of the connectors 21, the opening 17a of the component receptacle 17 for holding the component 16, the openings 3u of the operating modules 20 on the housing 3, and the like are also exposed. Therefore, in the first embodiment, as an example, a component, a hand, a finger, and the like moving closer or making operations to the openings 3u and 17a is less interrupted by the docking station 2. Furthermore, such an arrangement enables the second section 3Bb of the housing 3 that is an example of an area for releasing a large amount of heat from the housing 3 to be exposed from the docking station 2. Therefore, as an example, compared with an arrangement in which the second section 3Bb is covered by the docking station 2, heat dissipation performance can be better increased. Furthermore, as an example, the cooling efficiency can be better increased.

Figure 13:
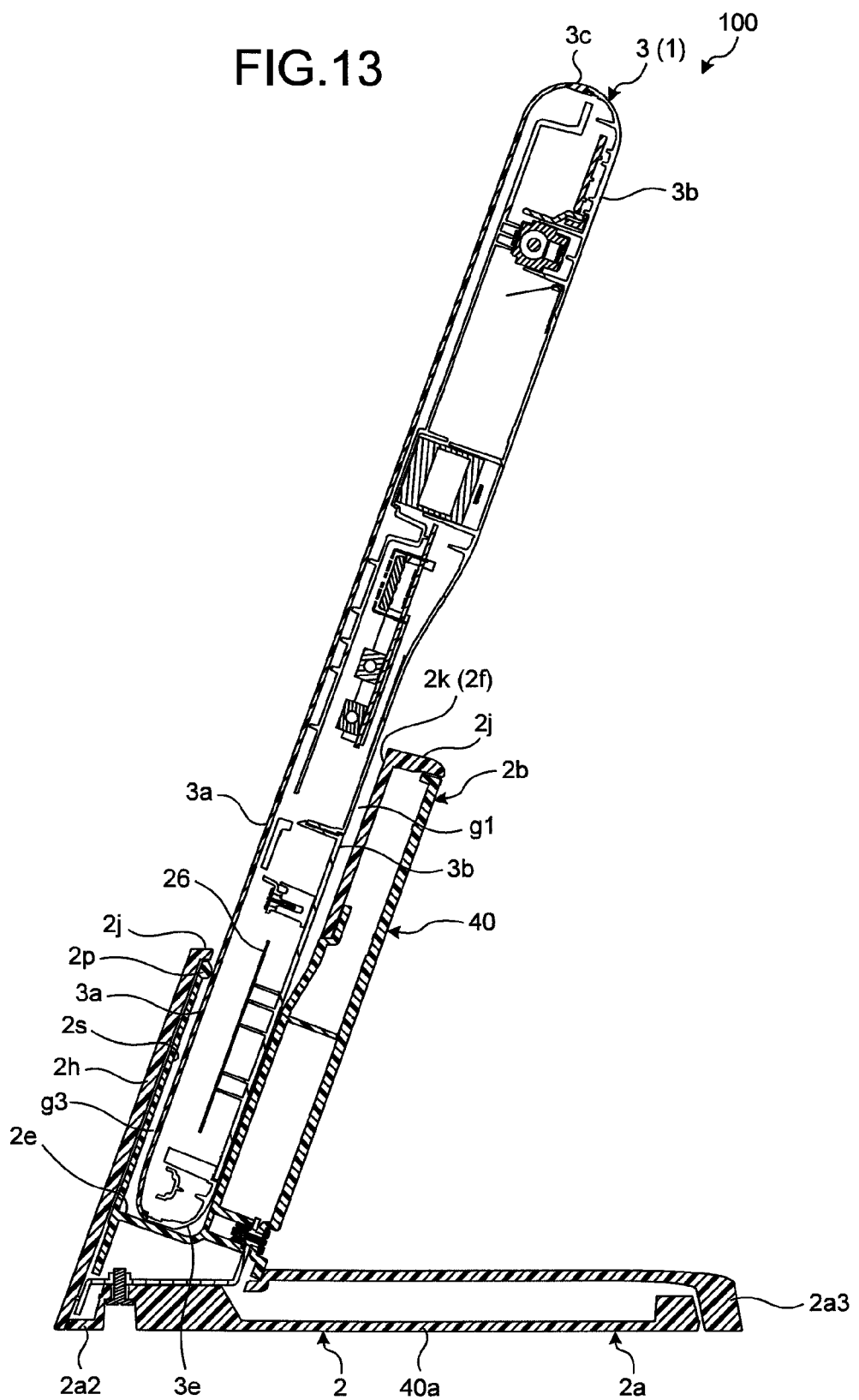
FIG. 13 is an exemplary cross sectional view of the television receiver held by the docking station taken along the line XIII-XIII of FIG. 1, in the first embodiment.
Figure 14:
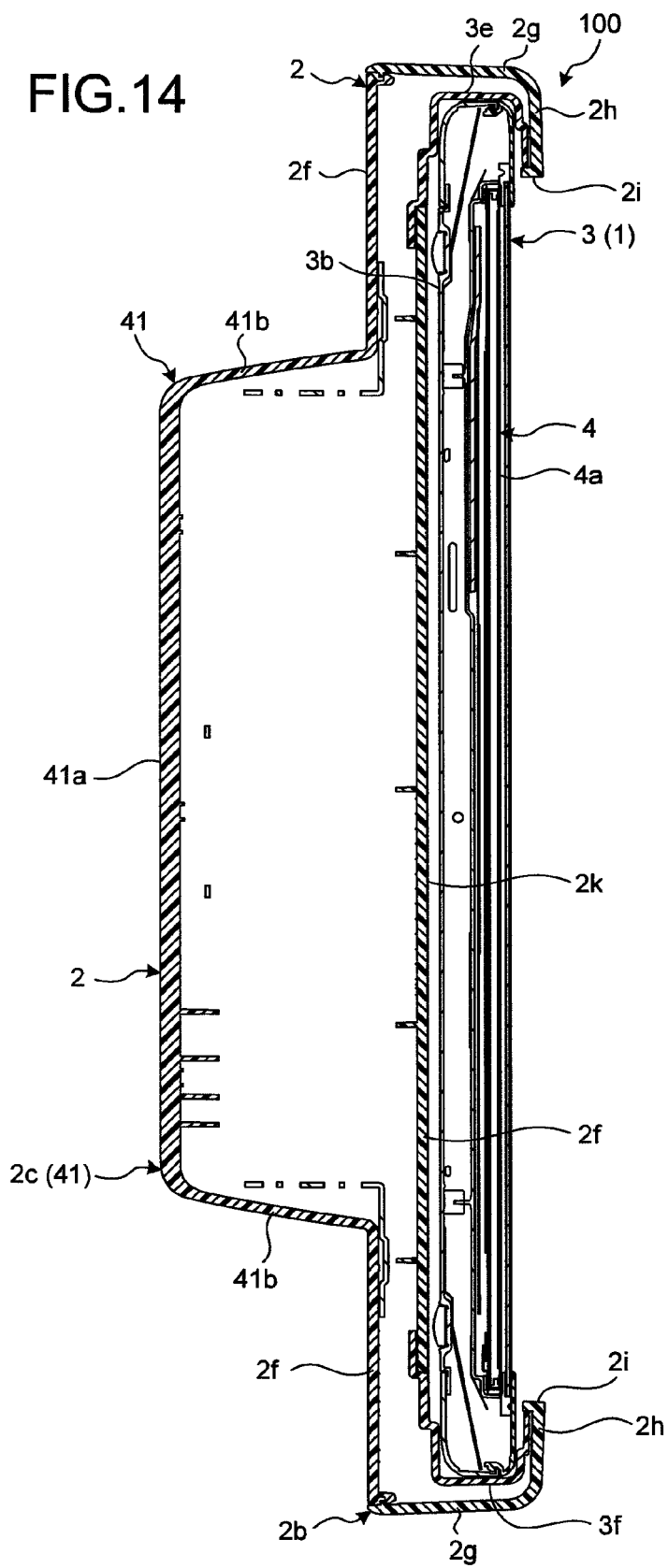
FIG. 14 is an exemplary sectional view of the television receiver held by the docking station taken along the line XIV-XIV of FIG. 1, in the first embodiment.

Furthermore, in the first embodiment, as an example, as illustrated in FIGS. 9, 11, and 13, protruding portions (projections) 2m and 2n are disposed on a surface (front surface) 2k of the wall portion 2f that supports the housing 3. More specifically, as illustrated in FIG. 11, the protruding portions 2m provided in plurality (in the first embodiment, two, as an example) are arranged along the end 2j of the wall portion 2f in an interspaced manner. Each of the protruding portions 2m extends along a direction I in which the housing 3 is brought in and out of the docking station 2 (the forward and backward directions, the direction for insertion, the direction for attaching and removing, the direction for mounting) at an approximately constant width. Furthermore, as illustrated in FIG. 9, the outer ends (end edges, front edges, tips, front ends) of the protruding portion 2m are curved in a manner convexed toward the normal direction of the wall portion 2f. Furthermore, as illustrated in FIG. 11, the protruding portions 2n provided in plurality (in the first embodiment, two, as an example) are arranged along the ends of the wall portions 2g. Each of the protruding portions 2n extends at an approximately constant width along the direction I in which the housing 3 is brought in and out of the docking station 2. The outer ends (end edges, front edges, tips, front ends) of the protruding portions 2n extend along the surface 2k of the wall portion 2f in parallel with the surface 2k in a planate form, as illustrated in FIG. 13. The protruding portions 2m and 2n are brought into contact with the rear surface (surface, second surface) 3b of the housing 3. The protruding portions 2m and 2n are disposed at different positions that are separated from each other along the direction in which the housing 3 is brought into and out of the docking station 2, and disposed at different positions that are separated from each other along the direction in perpendicular to the direction in which the housing 3 is brought into and out of the docking station 2. Therefore, according to the first embodiment, as an example, the housing 3 of the television receiver 1 positioned at the predetermined position is supported more securely from the rear side (back side, rear surface side, back surface side, behind side) by the protruding portions 2m and 2n that are arranged at a plurality of interspaced positions. Furthermore, the surface 2k of the wall portion 2f and the rear surface 3b of the housing 3 are separated by the protruding portions 2m and 2n, as illustrated in FIG. 13, and a gap g1 is formed between the surface 2k and the rear surface 3b. Therefore, in the first embodiment, as an example, the gap g1 prevents an increase of the frictional force caused by the surface 2k and the rear surface 3b being in contact, and suppresses the housing 3 of the television receiver (electronic device) 1 from being difficult to be moved away from the docking station 2. Furthermore, as an example, the gap g1 ensures a better air flow. Accordingly, the cooling performance can be increased. Furthermore, in the first embodiment, as an example, as illustrated in FIG. 13, protruding portions 2p are provided on the back side (rear side, rear surface side, back surface side, behind side) of the wall portion 2h. The protruding portions 2p are brought in contact with the front surface (surface, first surface) 3a of the housing 3. A gap g3 is also formed between the surface 3a of the housing 3 and a surface (back surface, rear surface) 2s of the wall portion 2h. These protruding portions 2p can also contribute in keeping the housing 3 of the television receiver 1 at the predetermined position in a more stable manner.

Figure 15:
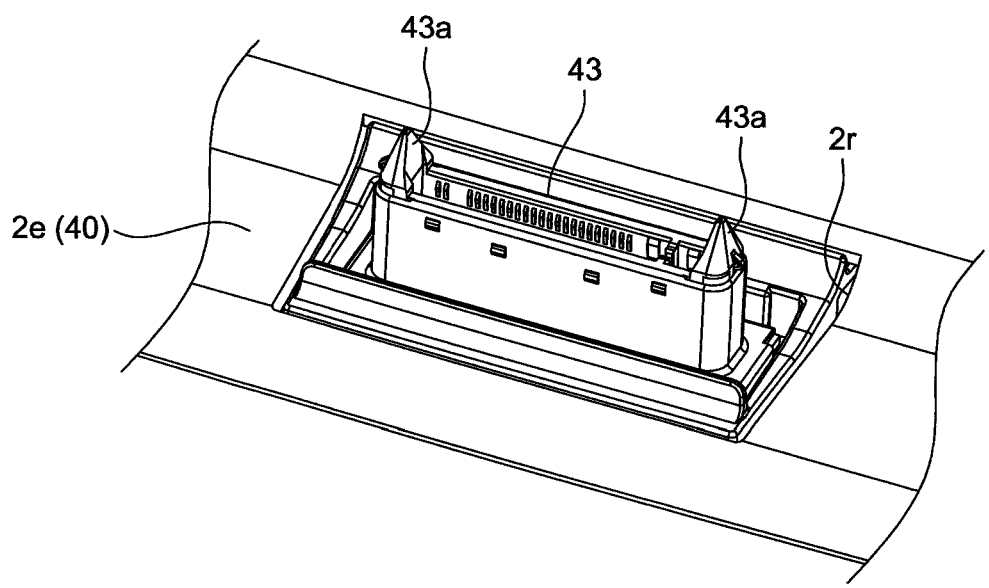
FIG. 15 is an exemplary perspective view of a portion of the docking station in the first embodiment.
Figure 17:
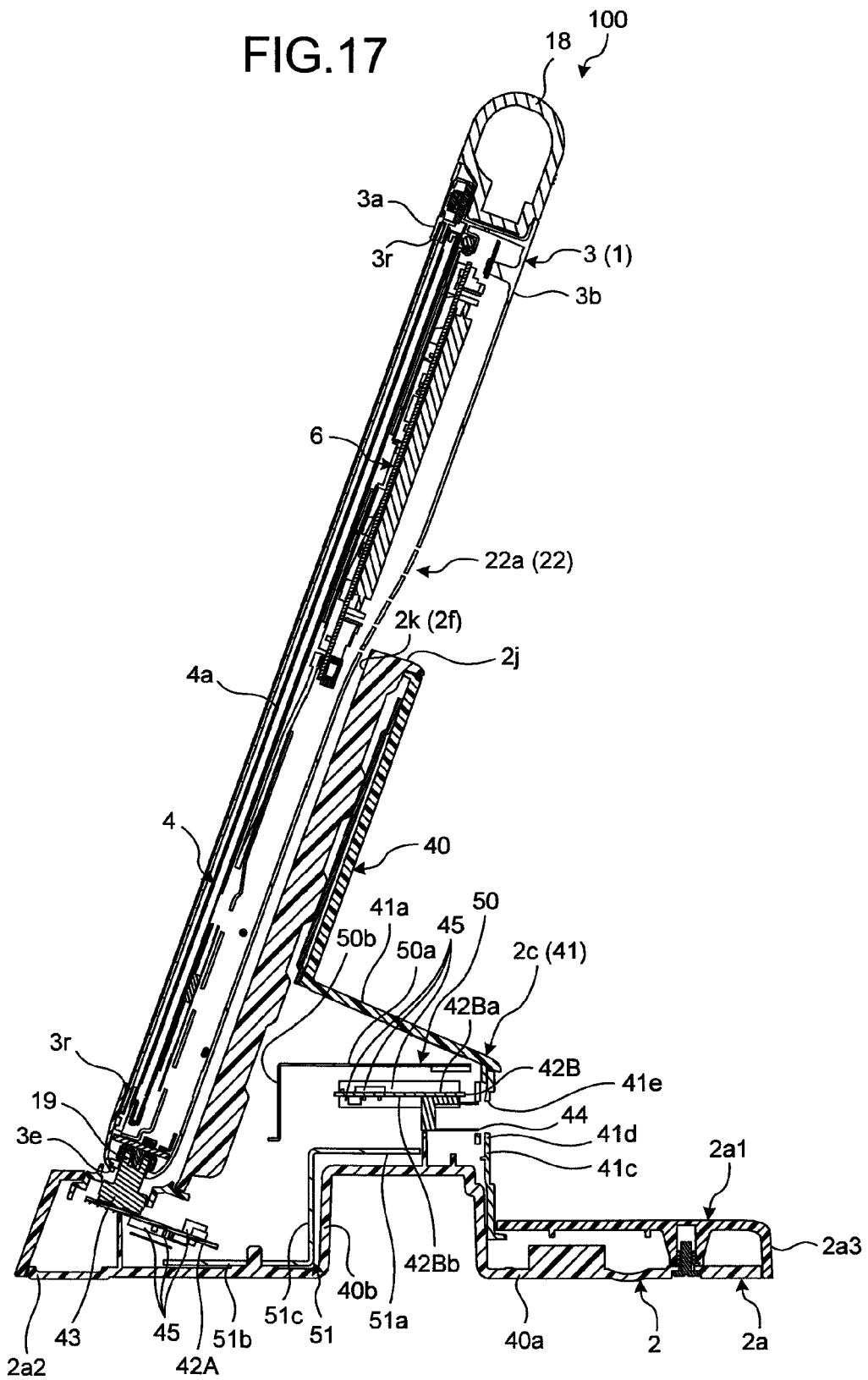
FIG. 17 is an exemplary sectional view of the television receiver held by the docking station taken along the line XVII-XVII of FIG. 1, in the first embodiment.
Figure 18:
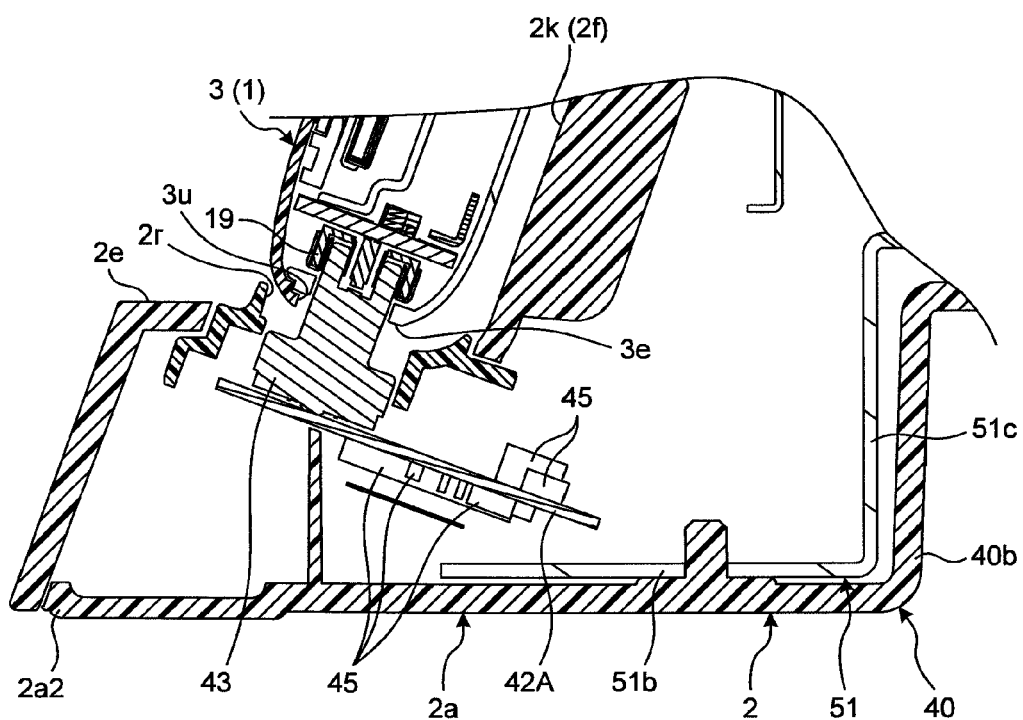
FIG. 18 is an exemplary enlarged view of a portion of the television receiver held by the docking station of FIG. 17, in the first embodiment.

Furthermore, in the first embodiment, as an example, an opening 2r is provided on the wall portion 2e. The connector 43 is exposed through the opening 2r, and protrudes out of the wall portion 2e, as illustrated in FIGS. 11 and 15. The connector 43 is inserted into the housing 3 of the television receiver 1 through the opening 3u arranged on the housing 3, coupled to the connector 19, and is electrically connected to the connector 19, as illustrated in FIGS. 17 and 18. Protruding portions (projections, guides) 43a functioning as guides when the connector 43 is coupled to the connector 19 are disposed on the respective corners along the sides of the connector 43 and at the tip of the connector 43.

Figure 16:
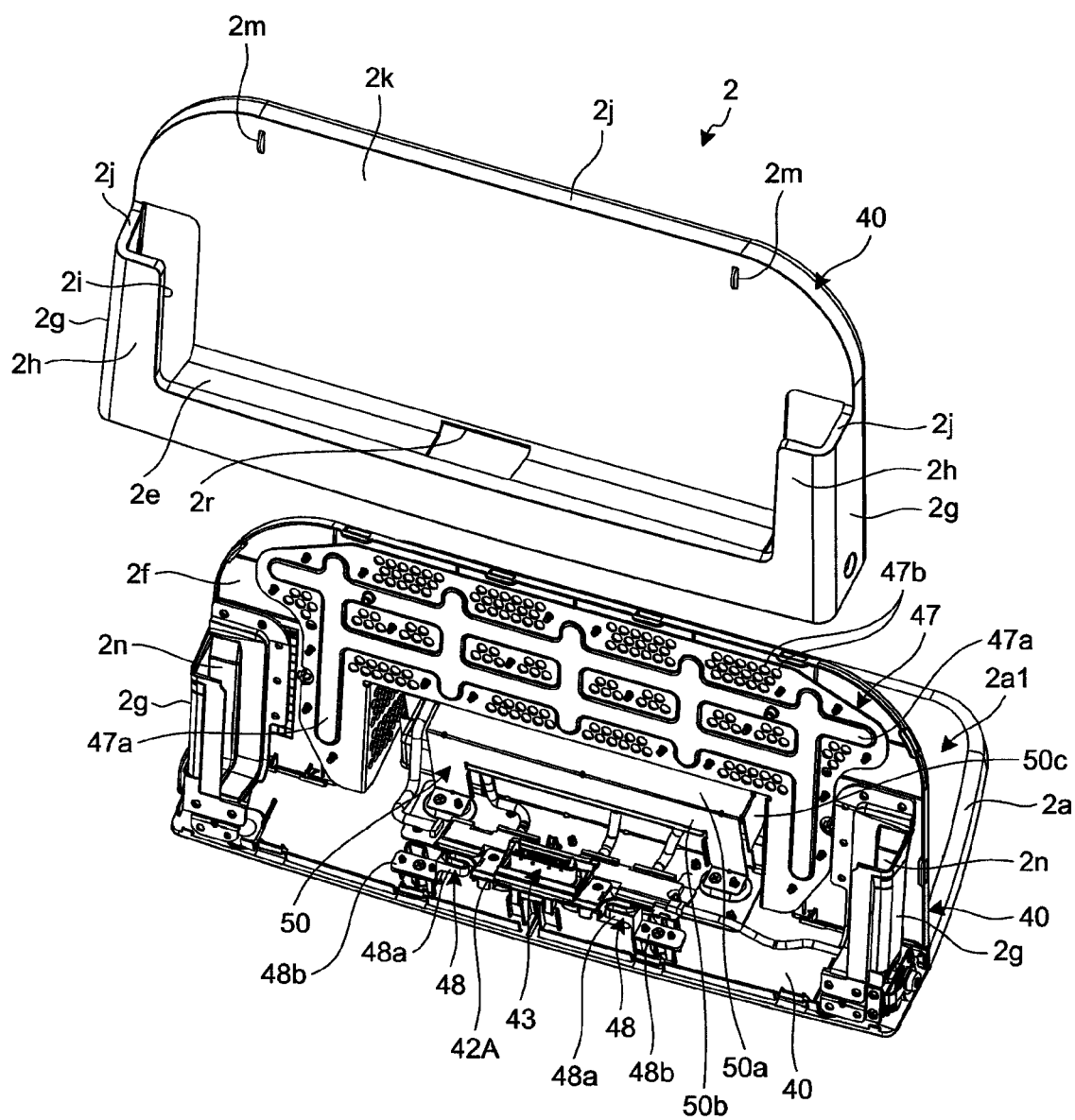
FIG. 16 is an exemplary exploded perspective view of the docking station in the first embodiment.
Figure 19:
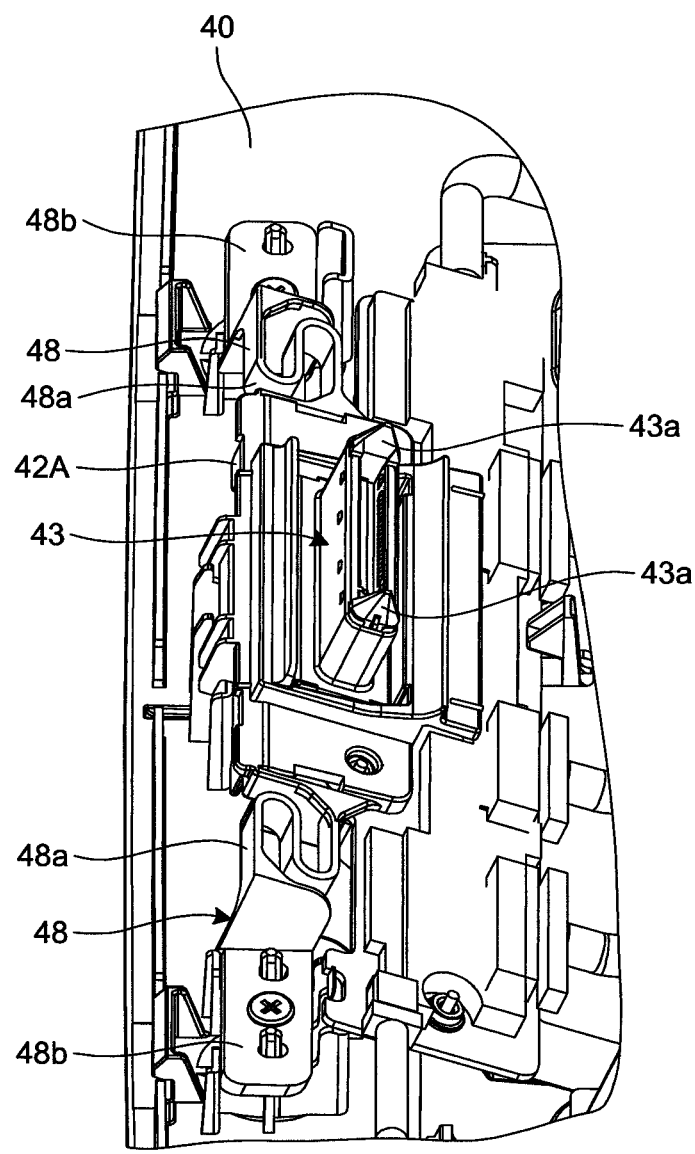
FIG. 19 is an exemplary perspective view of a portion of the docking station in the first embodiment.

In the first embodiment, as an example, the connector 43 is fixed to the board 42A, as illustrated in FIGS. 16 to 19. In the first embodiment, as an example, the connector 43 and the board 42A are supported on the housing 40 via elastic elements 48, as illustrated in FIGS. 16 and 19. More specifically, each of the elastic elements 48 comprises an elastic material (e.g., a metallic material, a synthetic resin material, and an elastomer) at least partially (an arm portion 48a). The elastic element 48 comprises the arm portion (extending portion, hanging portion, connecting portion, stretching portion, bridge portion, displaced portion, elastically deformed portion) 48a and a fixed portion 48b. The arm portions 48a stretch across the board 42A on which the connector 43 is fixed and the fixed portions 48b that are fixed to the housing 40. By means of specifications of the arm portion 48a (e.g., the material, the form, the direction, the length, the width, the height, the thickness, the curvature factor of a curved section), the elastic force (elasticity), the hardness, the amount of displacement, the force required in insertion (the pressing force required in mounting) can be set variably for the elastic elements 48. Each of the arm portions 48a is bent in an S-shape, as an example. The fixed portions 48b are coupled to the housing 40 using couplers such as screws 49. In the first embodiment, as an example, both ends of the connector 43 are supported respectively by the two elastic elements 48. In other words, the connector 43 is interposed between the two elastic elements 48. Such an arrangement enables the connector 43 to be supported more stably, compared with an arrangement in which only one end of the connector 43 is supported, as an example. In the first embodiment, as an example, the arm portion 48a is a band-like and plate-like member having a surface along the direction in which the housing 3 of the television receiver 1 is brought in and out of the docking station 2, and curved along the direction crossing (in the first embodiment, the direction in perpendicular to, the surface in perpendicular to, as an example) such an in-and-out direction. Therefore, the arm portion 48a is easily deformed in the direction crossing the in-and-out direction, and is not easily deformed in the direction in the in-and-out direction. Therefore, according to the first embodiment, as an example, when the housing 3 of the television receiver 1 is moved from the predetermined position along the direction crossing the in-and-out direction, the connector 43 can be moved easily in a manner corresponding to such a movement. In other words, with the connector 43 that can be elastically displaced, a movement of the connector 19 from the predetermined position can be better absorbed. Furthermore, according to the first embodiment, as an example, the connector 43 can be supported more securely against a movement of the connector 19 of the television receiver 1 along the in-and-out direction. Therefore, as an example, the television receiver (electronic device) 1 can be mounted on and removed from the docking station 2 easily. In other words, according to the first embodiment, as an example, by providing the elastic elements 48 (the arm portions 48a) having different elasticity (stiffness) in each direction, the positional changes can be absorbed (accommodated) easily, as well as mounting and removing operations can be performed easily.

Furthermore, in the first embodiment, as an example, as illustrated in FIG. 17, the board 42B having the connectors 44 other than the connector 43 (for example, a power connector, a video signal connector (e.g., a high-definition multimedia interface (HDMI) connector, a D-terminal connector, a DV-terminal connector), an audio signal connector (e.g., a phone terminal connector, a DIN connector), a data signal connector (e.g., a universal serial bus (USB) connector, a local area network (LAN) connector, an RS-232C connector), and a radio wave connector (e.g., coaxial cable connector), and an optical fiber connector) are installed in the housing 40, in addition to the board 42A having the connector 43 connected to the connector 19 provided on the television receiver 1 (the electronic device supported by the docking station 2). In other words, in the first embodiment, as an example, the boards 42A and 42B provided in plurality (in the first embodiment, two, as an example) are installed in the housing 40. The board 42B is disposed in a manner separated from the board 42A. In the first embodiment, as an example, the board 42B is positioned behind from the position of the board 42A (the opposite side of the display screen 4a). The board 42A and the board 42B are separated in the height direction as well. In the first embodiment, as an example, the board 42B is disposed at a position higher than the board 42A (away from the setting surface P). By arranging the boards 42A and 42B in the manner separated from each other, the layout of the components can designed more freely, as an example, and the size of the docking station 2 can be further reduced easily, as an example. Furthermore, because the positions where the connectors 44 are implemented on the board 42B can be specified independently of the position of the board 42A or the connector 43, as an example, an advantageous effect, such as a component, a finger, or a hand is not prevented from moving closer to the connectors 44 or from making operations on the connectors 44, can be achieved, as an example. Furthermore, as an example, the connectors 44 can be installed at a position that allows a component, a hand, or a finger to move closer or to make operations more easily.

Furthermore, in the first embodiment, as an example, as illustrated in FIGS. 16 and 17, the board 42B, the connectors 44, the electronic components 45, and the like implemented on the board 42B are covered by shield members (shield portions, covering members, covering portions, surrounding members, cover members, shielding members, conductors, conductive members) 50 and 51 in the component housing 41 (the housing 40). More specifically, the shield member 50 comprises a plurality of wall portions 50a to 50c, and the shield member 51 comprises a plurality of wall portions 51a to 51c. A surface (first surface, top surface) 42Ba and an opposite surface (second surface, bottom surface) 42Bb of the board 42B extend side by side with (in the first embodiment, in parallel with, as an example) the setting surface P. The wall portion 50a extends side by side with (in the first embodiment, in parallel with, as an example) the surfaces 42Ba and 42Bb of the board 42B, and covers the board 42B from the top. The wall portion 50b extends in a direction crossing (in the first embodiment, a direction in perpendicular to, as an example) the wall portion 50a, and covers the board 42B from the front side (from the side of the television receiver 1). The wall portion 50c extends in the direction crossing (in the first embodiment, as an example, a direction in perpendicular to) the wall portions 50a and 50b, and covers the board 42B from the lateral sides (the right and the left sides of the television receiver 1 in the front view; the right and the left sides in FIG. 16). The wall portion 51a extends side by side with (in the first embodiment, in parallel with, as an example) the surface 42Bb of the board 42B, and covers the board 42B from the bottom. The shield members 50 and 51 are made of a conductive material or a magnetic material, as an example. In this manner, in the first embodiment, as an example, the board 42B, the connectors 44, the electronic components 45, and the like implemented on the board 42B are covered by (the wall portion 50a to 50c of) the shield member 50 and (the wall portion 51a of) the shield member 51. Therefore, as an example, the shield members 50 and 51 prevent noise from being introduced easily to electric signals in the board 42B and circuits related to the connectors 44, the electronic components 45, and the like, and negative effects to the electric signals can be suppressed easily. Furthermore, as an example, because of the shield members 50 and 51, the stiffness of the housing 40 can be increased easily. Furthermore, because the shield member 50 is formed in a box-like shape, the stiffness of the housing 40 can be further increased more easily, as an example. Furthermore, in the first embodiment, as an example, as illustrated in FIG. 17, the shield member 51 comprises the wall portion 51b that extends side by side with (in the first embodiment, in parallel with, as an example) the wall portion 51a and disposed in a manner interspaced from the wall portion 51a at a position nearer to the setting surface P (a position lower) than the wall portion 51a, and the wall portion 51c extending in a direction crossing (in the first embodiment, a direction in perpendicular to, as an example) the wall portions 51a and 51b, and stretching across the wall portion 51a and the wall portion 51b. Therefore, according to the first embodiment, as an example, the shield member 51 further prevents noise from being introduced more easily to the electric signals, as an example, and the stiffness of the housing 40 can be further increased more easily. Furthermore, according to the first embodiment, as an example, the shield members 50 and 51 can function as a part of the frame 47. Furthermore, in the first embodiment, as an example, the frame 47 that is separate from the shield members 50 and 51 is disposed in the housing 40 along the wall portion 2f, as illustrated in FIG. 16. The frame 47 is formed in a plate-like shape, and comprises a plurality of protruding portions (backbone portions) 47a and a plurality of through-holes 47b are provided on the frame 47. In this manner, as an example, the frame 47 can be made more light-weighted, and the stiffness of the housing 40 can be increased easily. In the first embodiment, as an example, the frame 47 is made of a conductor (conductive material). The frame 47 and the shield members 50 and 51 are electrically connected, and set to the ground potential. Therefore, in the first embodiment, as an example, noise is further prevented from being introduced to the electric signals more easily. The frame 47 is an example of the shield member. The shield members 50 and 51 are examples of the frame.

Furthermore, in the first embodiment, as an example, as illustrated in FIGS. 13 and 16, the shield members 50 and 51 and the frame 47 are not formed in parts of the second support 2b corresponding to the wall portions 2g and 2h. The wall portions 2g and 2h are made of an insulator (a non-conductive material, such as a synthetic resin material, as an example). The antennas 26 (see FIG. 7) come to positions corresponding to the wall portions 2g and 2h of the television receiver 1 when the television receiver 1 is mounted on the docking station 2. Therefore, according to the first embodiment, as an example, the reduction in the communication performance of the antennas 26 caused by the shield members 50 and 51 or the frame 47 can be better suppressed. In other words, in the first embodiment, as an example, at least one side (in the first embodiment, the front and the lateral sides of the display screen 4a, viewed from the front, when the television receiver 1 is mounted on the docking station 2, as an example) of the parts corresponding to the antennas 26 are electromagnetically exposed (not covered by a conductor).

Furthermore, in the first embodiment, as an example, as illustrated in FIGS. 9, 10, 12, and 17, the component housing 41 comprises a wall portion 41a disposed on the top (upper wall, top wall, first wall portion), wall portions 41b (side walls, vertical walls, upright walls, standing walls, second wall portions) disposed at the right side and the left side viewed from the rear (viewed from the front), and a wall portion 41c disposed on the rear side (behind side) (rear wall, back wall, second wall portion). The wall portions 41b are examples of side ends of the component housing 41. The wall portion 41c is an example of a rear end of the component housing 41.

Figure 10:
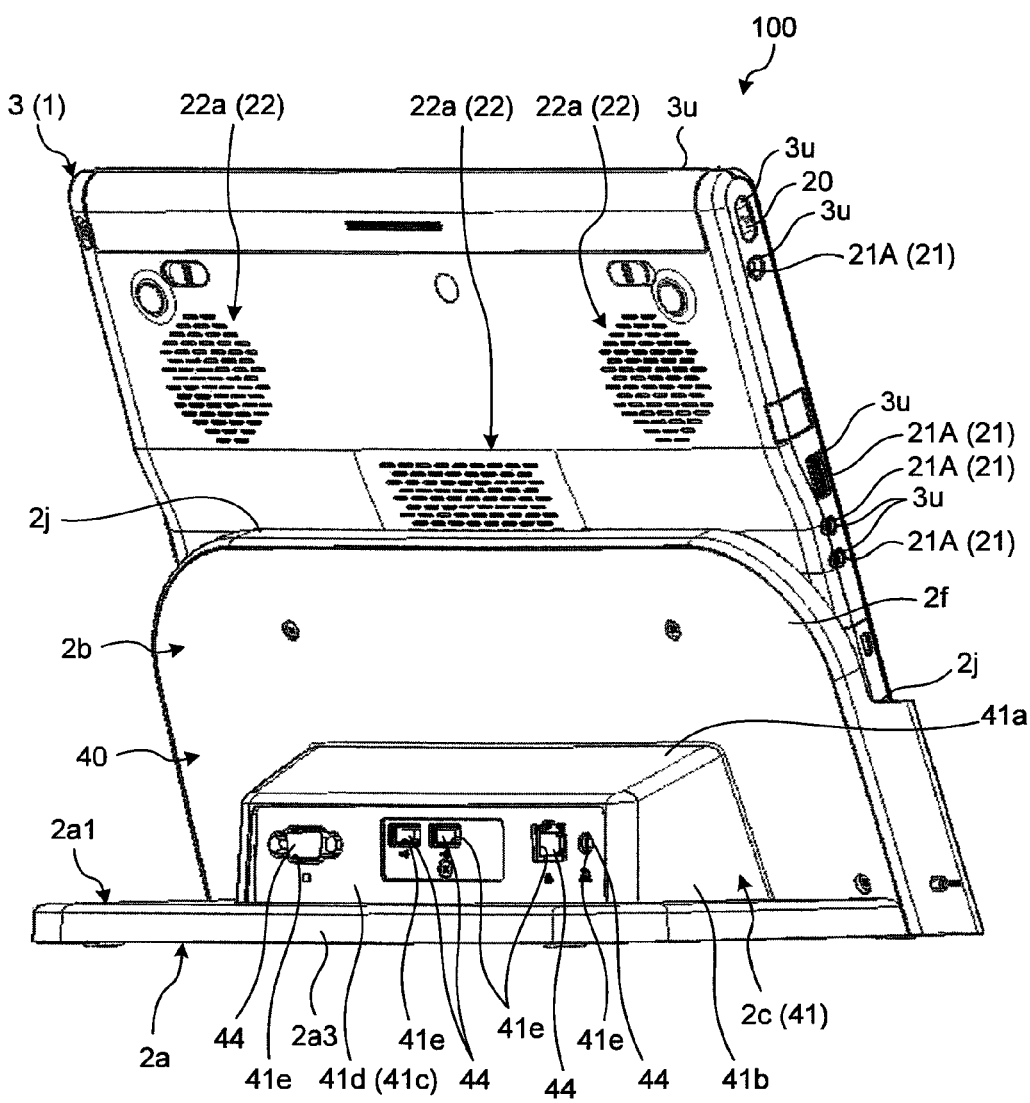
FIG. 10 is an exemplary perspective view of a state in which the television receiver is held by the docking station, as viewed from behind, in the first embodiment.
Figure 12:
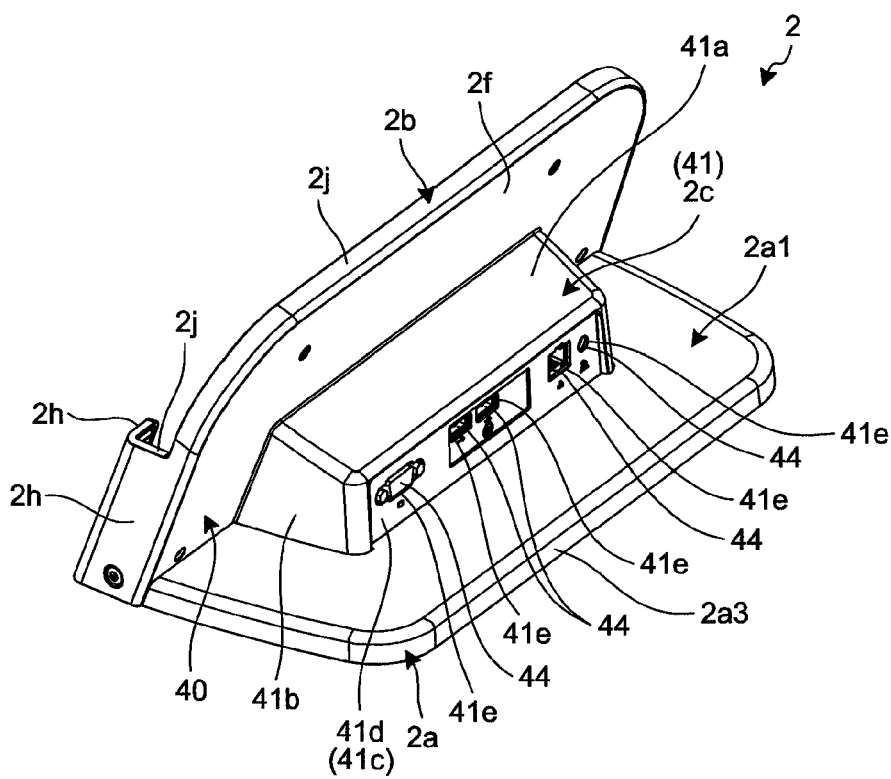
FIG. 12 is an exemplary perspective view of the docking station as viewed from above in different angle, in the first embodiment.

Furthermore, in the first embodiment, as an example, as illustrated in FIGS. 10, 12, and 17, the connectors 44 are respectively exposed through openings 41e provided on a surface 41d of the wall portion 41c of the component housing 41 (the housing 40). In the first embodiment, as an example, the end 2a3 of the first support 2a is interspaced from the wall portion 41c (surface 41d, end) on the side on which the connectors 44 open (unclosed side, open side of the opening 41e; in the first embodiment, rear side, as an example). In other words, in the first embodiment, as an example, the first support 2a comprises a protruding portion (projecting portion, flange portion, extending portion, peripheral portion, peripheral end portion, bottom part, laid portion, foot portion, wall portion) 2a1 protruding from the wall portion 41c toward the rear side, that is, protruding from the wall portion 41c toward the side on which the connectors 44 open. In the first embodiment, as an example, the protruding portion 2a1 is formed in a flat, plate-like shape. However, the protruding portion 2a1 can be structured in various shapes. For example, the protruding portion 2a1 may be band-shaped, stick-shaped, mesh-like, ring-shaped, or can have an opening such as a cutout or a through-hole, or a concaved and convexed part provided thereon. In the first embodiment, as an example, the protruding portion 2a1 covers a connector, a cable (harness, wiring), and the like (not illustrated) coupled to the connectors 44 from the bottom. In other words, the protruding portion 2a1 is an example of a covering portion (cover portion, protecting portion). Furthermore, because the protruding portion 2a1 protrudes from the wall portion 41c, connectors and cables coupled to the connectors 44 are prevented from being hit by other objects (e.g., a wall, equipment, or a component). In other words, the protruding portion 2a1 is an example of a preventing portion (protecting portion). The protruding portion 2a1 also extends in directions crossing (in the first embodiment, directions perpendicular to, directions toward the right side and the left side, viewed from the front and from the rear, as an example) the backward direction along the setting surface P (see FIG. 9). In other words, the protruding portion 2a1 also protrudes sideways from the wall portion 41b. Therefore, as an example, a space (area) for passing a connector or a cable can be ensured above the protruding portion 2a1 easily. The protruding portion 2a1 can also have a mechanism for hanging or fixing a cable, for example (e.g., a protruding portion, a wall portion, a recess, a groove, an engaged portion, or a hook). Furthermore, the opening 41e may be provided on the wall portion 41b, and the connectors 44 may be exposed through the opening 41e.

In the first embodiment, as an example, as illustrated in FIG. 17, a wall portion (bottom wall portion, bottom part) 40a of the housing 40 is recessed (projected) so that a protruding portion (recessing portion) 40b is formed in the direction moving away from the setting surface P (upwardly). The board 42B is coupled to the protruding portion 40b using couplers such as screws (not illustrated). Therefore, according to the first embodiment, as an example, a structure in which the board 42B is provided at a position separated from the setting surface P can be obtained as in a simpler manner. Furthermore, the protruding portion 40b enables the stiffness of the housing 40 to be increased easily, as an example.

Figure 20:
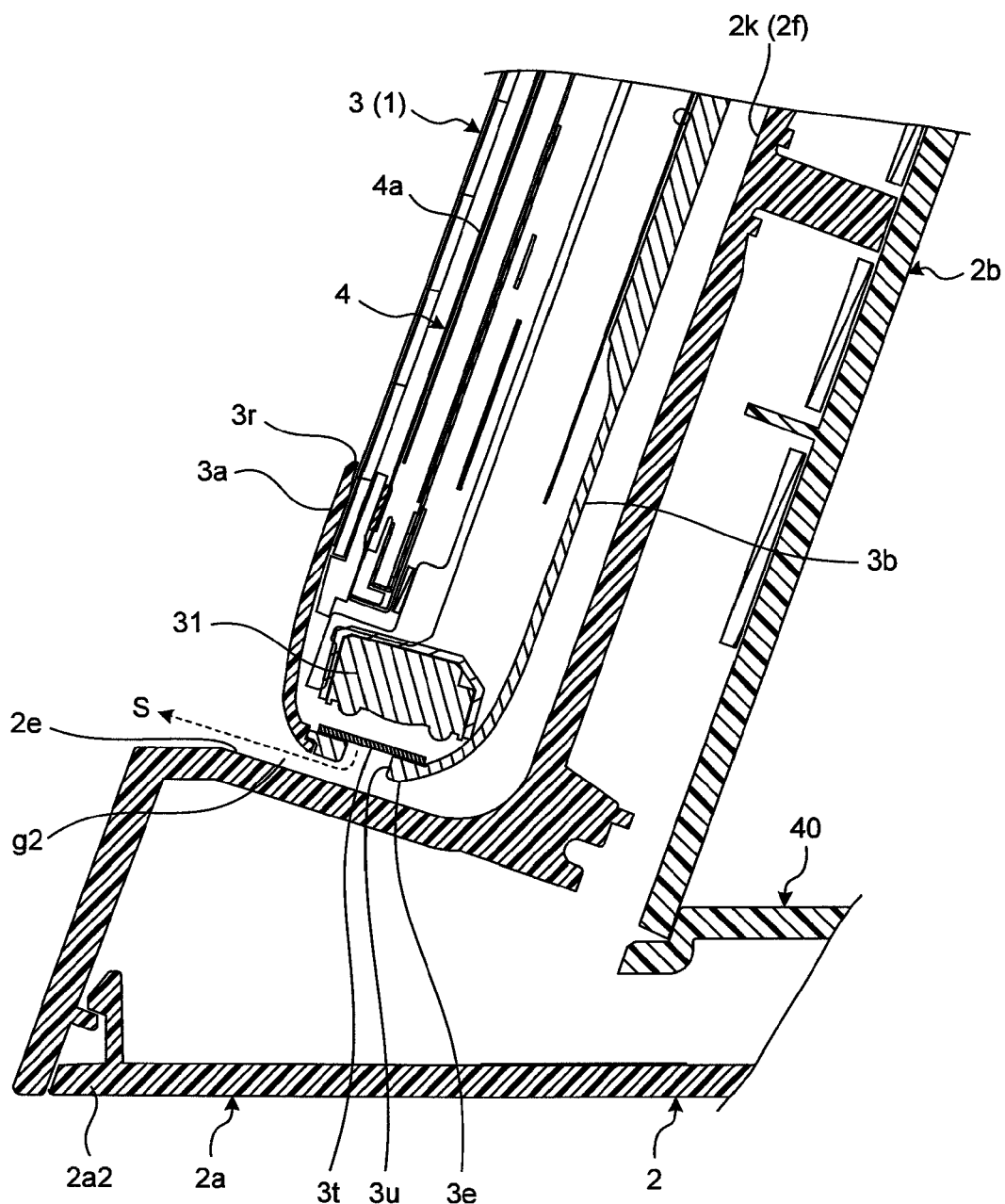
FIG. 20 is an exemplary sectional view of the television receiver held by the docking station, taken along the line XX-XX of FIG. 1, in the first embodiment.

Furthermore, in the first embodiment, as an example, as illustrated in FIG. 20, when the television receiver 1 is located at the predetermined position of the docking station 2, a gap g2 opened at least to one side of outside of the housing 40 is formed between the wall portion 3n of the housing 3 of the television receiver 1 and the wall portion 2e of the housing 40 of the docking station 2, in a manner facing the opening 3u disposed correspondingly to a speaker 31 installed in the housing 3, that is, the opening 3u having the speaker cover 3t for covering the speaker 31 (see FIG. 2). Therefore, according to the first embodiment, as an example, a sound S output from the speaker 31 passes through the gap g2, and is let out of the housing 3 and the docking station 2. Therefore, in the first embodiment, as an example, the docking station 2 can better prevent the sound S output from the speaker 31 from being hard to be heard, easily.

Figure 21:
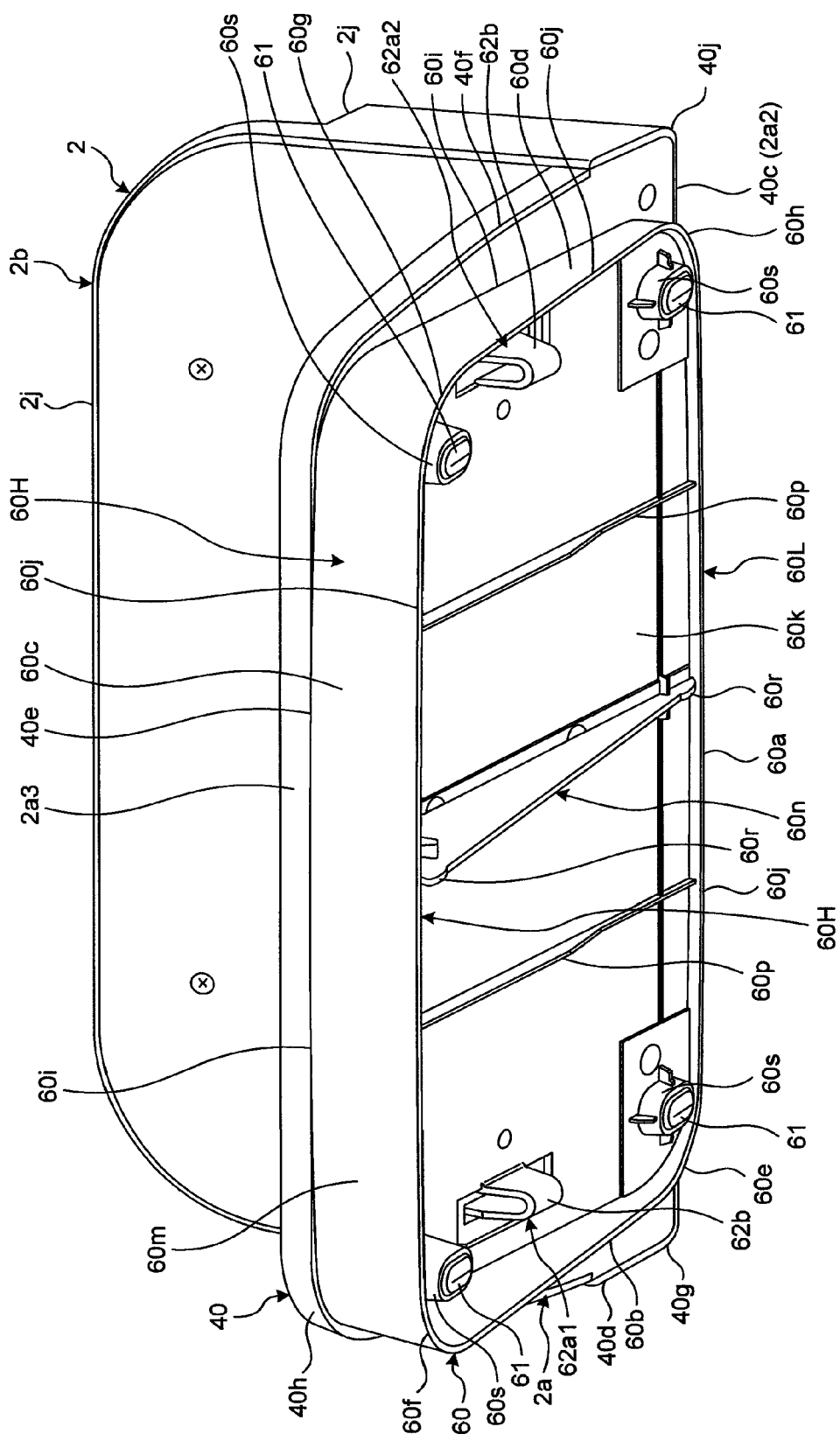
FIG. 21 is an exemplary perspective view of a state in which an attachment is attached to the docking station in the first embodiment.
Figure 24:
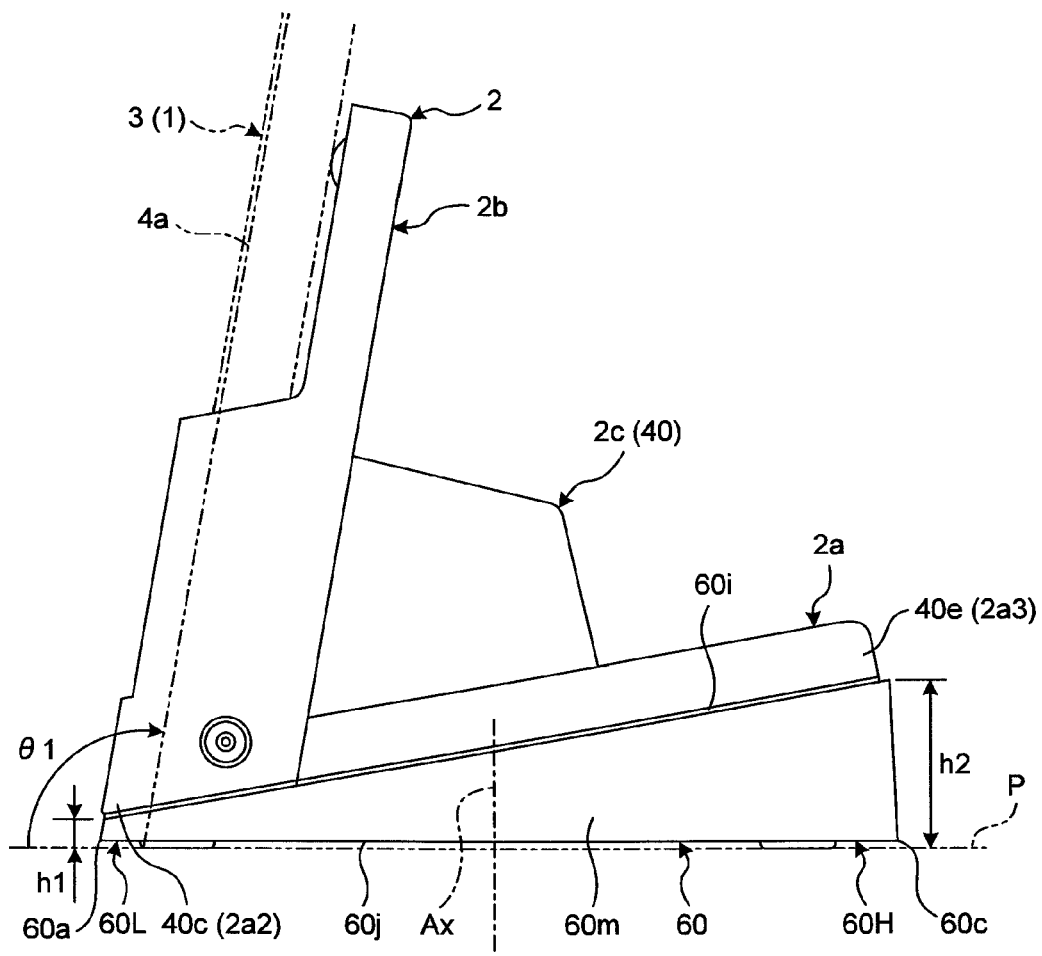
FIG. 24 is an exemplary side view of a state in which the attachment is attached to the docking station in the first embodiment.

In the first embodiment, as an example, as illustrated in FIG. 21, an attachment 60 is attached to the docking station 2. The attachment 60 is placed on the bottom part of the docking station 2, and is interposed between the docking station 2 and the setting surface P (placed portion, see FIGS. 24 and 26). In the first embodiment, as an example, the angle of the display screen 4a on the television receiver (electronic device) 1 (the posture of the television receiver 1) being kept standing can be changed (set variably) depending on whether the attachment 60 is attached, and different posture in which the attachment 60 is attached (attachment position, mounted posture, mounted position, added posture, added position). The attachment 60 is an example of a protruding portion and a component (structure). In the first embodiment, as an example, the attachment 60 may be made of a synthetic resin material or a metallic material, for example (in the first embodiment, a synthetic resin material, as an example).

Figure 22:
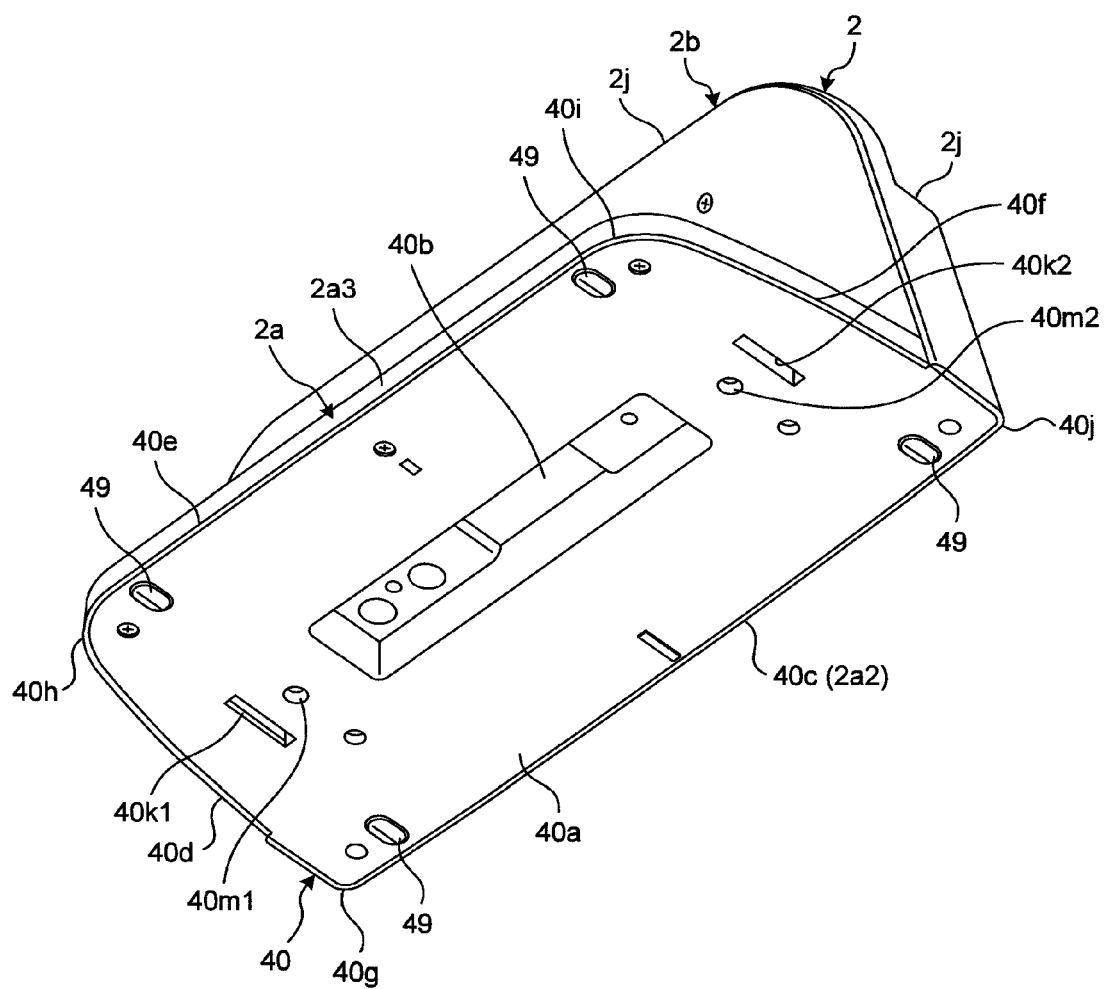
FIG. 22 is an exemplary perspective view of the docking station as viewed from below, in the first embodiment.

In the first embodiment, as an example, as illustrated in FIG. 22, the reverse side (back side of the first support 2a) of the housing 40 of the docking station 2 to which the attachment 60 is attached is covered by the wall portion 40a. Specifically, the wall portion 40a is formed in a trapezoidal shape having a longer base along the front side, and a shorter base along the bottom side. In the first embodiment, as an example, the bottom part of the housing 40 comprises four ends (side portions, edge portions) 40c to 40f and four corners (pointed portion, curved portion, ends) 40g to 40j. The ends 40c and 40e are examples of longer sides. The ends 40d and 40f are examples of shorter sides.

In the first embodiment, as an example, the wall portion 40a also comprises protruding portions 49 that are foot portions, and engaged portions 40k1 and 40k2 and engaged portions 40m1 and 40m2 that are engaged with the attachment 60, as well as the recessing portion formed by the protruding portion 40b. More specifically, the four protruding portions 49 are disposed near the four corners 40g to 40j, respectively. The protruding portion 49 can be made of an elastic material, such as an elastomer. The protruding portions 49 have a function of alleviating or absorbing impact, and suppressing instability or vibrations. The engaged portions 40k1 and 40k2 are openings (e.g., through-holes, cutouts, or recessing portions; in the first embodiment, through-holes in a shape of an elongated rectangle or a slit, as an example) formed on the wall portion 40a, as an example. The engaged portions 40m1 and 40m2 are openings (e.g., recessing portions, through-holes, or cutouts; in the first embodiment, recessing portions having a circular cross section and a bottom, as an example) formed on the wall portion 40a, as an example.

Figure 23:
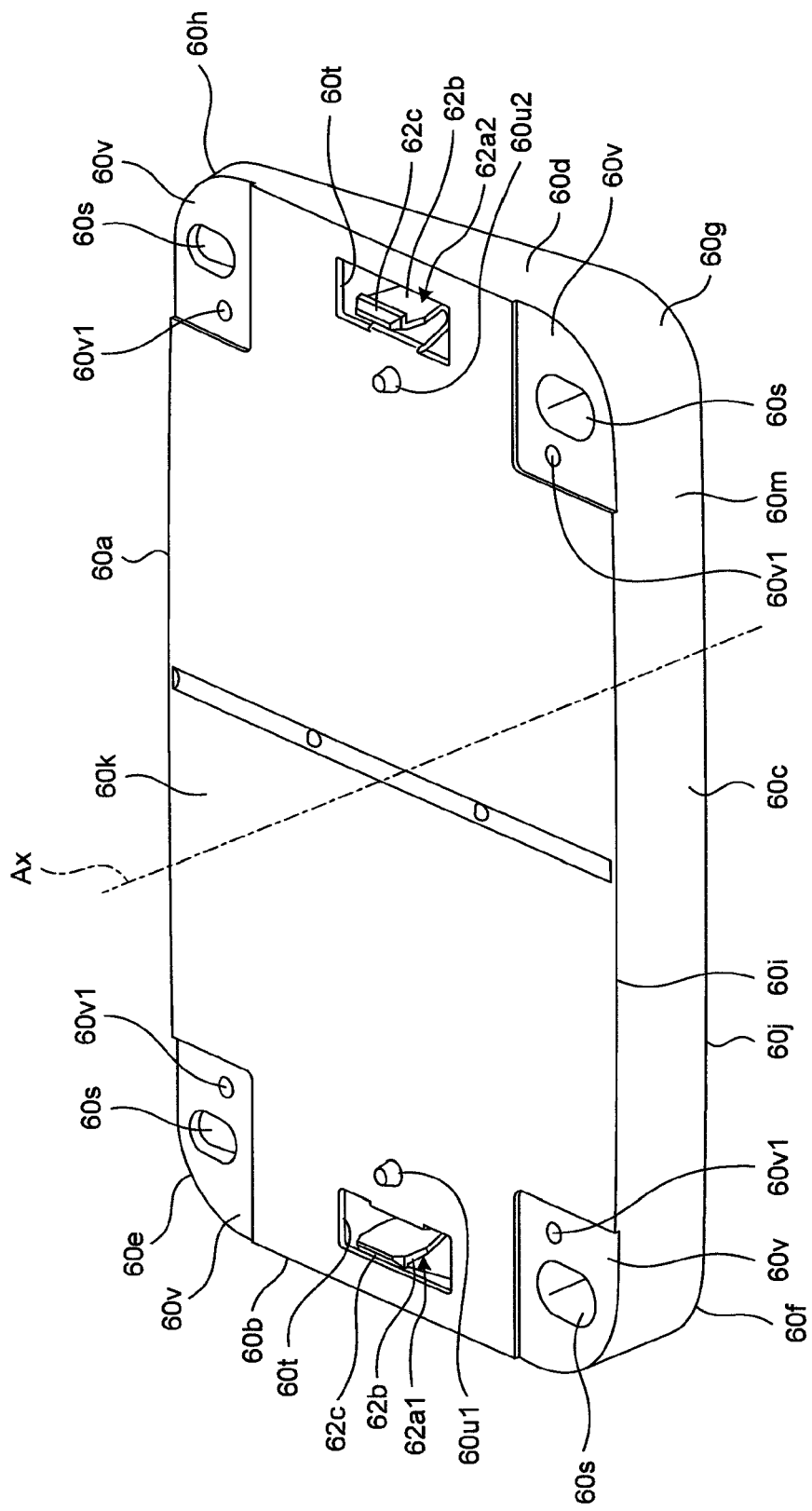
FIG. 23 is an exemplary perspective view of the attachment in the first embodiment.

In the first embodiment, as an example, as illustrated in FIG. 21, the attachment 60 is attached to the docking station 2 from the bottom (lower side, back surface side, bottom side). In the first embodiment, as an example, the attachment 60 is configured in a rectangular shape (in the first embodiment, an oblong, as an example) in the plan view, and is configured in a trapezoidal shape viewed from the side. In the first embodiment, as an example, as illustrated in FIG. 23, the attachment 60 comprises four ends (side portions, end portions) 60a to 60d and four corners (pointed portions, curved portions, ends) 60e to 60h in the plan view. The ends 60a and 60c are examples of longer sides. The ends 60b and 60d are examples of shorter sides. The attachment 60 comprises an edge (first end, upper end) 60i and an edge (second end, lower end) 60j viewed from the side. The attachment 60 also comprises wall portions 60k and 60m. The wall portion (upper wall portion, top wall portion, horizontal wall portion) 60k is disposed in a plate-like manner along the upper edge 60i. The wall portion (side wall portion, wall portion, vertical wall portion) 60m extends from each of the ends 60a to 60d of the wall portion 60k to the direction crossing the wall portion 60k (vertical directions). The edge 60i having the wall portion 60k functions as a mounted portion (upper portion, mounting portion, receiving portion, placing portion, support, attaching portion) on which the docking station 2 is placed. The edge 60j of the wall portion 60m functions as a base (platform portion, bottom part, lower portion, foundation portion, base, base portion, mounting portion, foot portion, foot) to be placed on the setting surface P (see FIG. 9). In the first embodiment, as an example, the attachment 60 comprises a first section 60L having a smaller height on the side of the end 60a (with a smaller thickness, height: first height h1, see FIGS. 24 and 26) and a second section 60H having a higher height (with a larger thickness, height: second height h2, see FIGS. 24 and 26) on the side of the opposite end 60c.

In the first embodiment, as an example, as illustrated in FIG. 21, a plurality of ribs (wall portions, protruding portions) 60n and 60p (in the first embodiment, three as an example) are disposed on the back side of the wall portion 60k. Among the three, the rib 60n located at the center in the right-and-left direction (width direction, longitudinal direction), viewed from the front, extends along a direction crossing the setting surface P and the wall portion 60k (in the first embodiment, perpendicular direction, vertical direction, thickness direction, height direction, as an example) and along the front-back direction (depth direction, short side direction), and extends from near the wall portion 60k that is on the edge 60i to near the edge 60j. Protruding portions 60r are disposed on the bottom end of the rib 60n facing the setting surface P. The protruding portions 60r are brought into contact with the setting surface P when the wall portion 60k is bent by the weight of the television receiver 1, or by a pressing force applied when the television receiver 1 is mounted on the docking station 2. The protruding portions 60r are respectively disposed on both ends in the front-back direction (depth direction, short side direction).

In the first embodiment, as an example, as illustrated in FIG. 21, the ends 40d and 40f of the wall portion 40a (the first support 2a) of the docking station 2 extend out of the ends 60b and 60d of the attachment 60, respectively, in a state in which the docking station 2 is coupled to the attachment 60. Therefore, in the first embodiment, as an example, the extending portions (near the corners 40g and 40j) may be used as engaged portions (handle portions) when the user lifts the docking station 2 and the attachment 60. The engaged portions are formed by making the length (width) of the end 40c of the docking station 2 longer than the length (width) of the end 40e, and by making the length (width) of the ends 60a and 60c of the attachment 60 almost equal to the length of the end 40e.

Furthermore, in the first embodiment, as an example, as illustrated in FIG. 23, a recessing portion that concaves backwardly is disposed on each of the corners 60e to 60h of the wall portion 60k. In this manner, as illustrated in FIG. 21, a protruding portion 60s is formed on each of the corners 60e to 60h of the bottom part of the attachment 60. On the tip of the protruding portion 60s, a protruding portion 61 is disposed. The protruding portion 61 protrudes out of the edge 60j downwardly. Therefore, in the attachment 60, the protruding portions 61 and 60s function as a foot portion (support). The protruding portion 61 can be made of an elastic material such as an elastomer. The protruding portion 61 has a function of alleviating or absorbing impact, and suppressing instability or vibrations.

In the first embodiment, as an example, a recessing portion 60v that is shallower than the recessing portion comprising the protruding portion 60s is disposed around the recessing portion and at each of the corners 60e to 60h of the wall portion 60k. The protruding portions 49 (see FIG. 22) provided on the docking station 2 fit into the recessing portions 60v when the attachment 60 is coupled to the docking station 2. In other words, as an example, the recessing portion 60v can reduce the gap formed between the wall portion 40a of the docking station 2 and the wall portion 60k of the attachment 60. Furthermore, as an example, it is possible to better suppress the protruding portions 49 of the docking station 2 from interfering with the wall portion 60k of the attachment 60. Therefore, as an example, the attachment 60 and the docking station 2 can be more stably coupled easily. Furthermore, if the attachment 60 is to be formed by resin molding, a casting gate (gate) 60v1 through which flowing resin is poured when the attachment 60 is resin-molded can be arranged in a manner facing the recessing portion 60v. By arranging the casting gate 60v1 in a manner facing the recessing portion 60v, post-processes of the resin can be performed at the casting gate 60v1 more easily compared with an arrangement in which the casting gate is arranged facing the wall portion 60k, which has a higher requirement for flatness, as an example.

Furthermore, in the first embodiment, as an example, as illustrated in FIGS. 21 and 23, the wall portion 60k comprises openings (in the first embodiment, through-holes, as an example) 60t. Engaged portions 62a1 and 62a2 are disposed on respective edges of the openings 60t. As an example, each of the openings 60t is formed in a rectangular shape and a slit-like shape extending along and elongated in the front-back direction. Furthermore, each of the engaged portions 62a1 and 62a2 comprises an arm portion (extending portion, hanging portion, displaced portion, elastically-deformed portion) 62b and a claw portion (protruding portion, projecting portion, hook portion, pointed portion) 62c. The arm portion 62b is extended downwardly from a part of the edge of the opening 60t (in the first embodiment, a part of the edge near the center of the wall portion 60k and along the front-back direction, as an example), bent into a U shape at the lower end, folded up, and then extended upwardly, and protrudes out upwardly through the opening 60t. At the tip of the arm portion 62b, the claw portion 62c is disposed in a hook-like shape. The arm portion 62b extends in a band-like shape at an approximately constant width, and is bent (curved). In the first embodiment, as an example, as illustrated in FIG. 21, the bottom part of the attachment 60 (on the side of the edge 60j) is kept open. Therefore, a user and the like can make operation on the engaged portions 62a1 and 62a2, using a hand or a finger, from the bottom of the attachment 60. In the first embodiment, as an example, as illustrated in FIG. 23, the wall portion 60k also comprises engaged portions 60u1 and 60u2. As an example, each of the engaged portions 60u1 and 60u2 is formed as a protruding portion (projection) in a shape of a circular truncated cone (cylinder).

In the first embodiment, as an example, the engaged portions 62a1 and 62a2 of the attachment 60 are engaged with the engaged portions 40k1 and 40k2 of the docking station 2, respectively. The engaged portions 60u1 and 60u2 of the attachment 60 are engaged with the engaged portions 40m1 and 40m2 of the docking station 2, respectively. Specifically, the claw portion 62c of each of the engaged portions 62a1 and 62a2 of the attachment 60 is brought through corresponding one of the engaged portions 40k1 and 40k2 of the docking station 2, and is engaged with (hooked to) the end portion of the corresponding engaged portion 40k1 or 40k2. Furthermore, each one of the engaged portions 60u1 and 60u2 of the attachment 60 is inserted into corresponding one of the engaged portions 40m1 and 40m2 of the docking station 2. By engaging the engaged portions 62a1 and 62a2 with the engaged portions 40k1 and 40k2, respectively, and by engaging the engaged portions 60u1 and 60u2 with the engaged portions 40m1 and 40m2, respectively, the docking station 2 and the attachment 60 are aligned and coupled. The engaged portions 40k1 and 40k2 and the engaged portions 40m1 and 40m2 are examples of first engage portions. The engaged portions 62a1 and 62a2 and the engaged portions 60u1 and 60u2 are examples of second engage portions.

When the attachment 60 is attached to the docking station 2, in the first embodiment, as an example, as the attachment 60 is brought closer to the docking station 2 in a manner so that the engaged portions 62a1 and 62a2 respectively correspond to (face) the engaged portions 40k1 and 40k2, and the engaged portions 60u1 and 60u2 respectively correspond to (face) the engaged portions 40m1 and 40m2, the claw portions 62c of the engaged portions 62a1 and 62a2 of the attachment 60 respectively abut against the edges of the engaged portions 40k1 and 40k2 of the docking station 2. The engaged portions 62a1 and 62a2 are then respectively pressed against the edges of the engaged portions 40k1 and 40k2, thus elastically being deformed in a direction causing the claw portions 62c to be less projected from the engaged portions 40k1 and 40k2 (the direction narrowing the U shape), and the claw portions 62c are carried over the respective edges of the engaged portions 40k1 and 40k2. In this manner, the claw portions 62c respectively brought through the engaged portions 40k1 and 40k2, and are respectively hooked onto the back surfaces of the engaged portions 40k1 and 40k2 at the edges of the engaged portions 40k1 and 40k2 (onto the wall portion 40a). Because the elastic force is acting on each of the engaged portions 62a1 and 62a2 in a direction where the claw portions 62c are overlapped with the edges of the engaged portions 40k1 and 40k2, respectively (in the direction widening the U shape), the engaged portions 62a1 and 62a2 are kept engaged with the engaged portions 40k1 and 40k2, respectively, when no external force is applied. Furthermore, the edge of each of the engaged portions 40m1 and 40m2 is nipped between the corresponding claw portion 62c and the wall portion 60k of the attachment 60 in the direction in which the attachment 60 is overlapped with (the direction in which the attachment 60 is brought closer to) the docking station 2. On the contrary, in the first embodiment, as an example, when the attachment 60 is to be removed from the docking station 2, the engaged portions 60u1 and 60u2 are pushed by fingers or hands, and the claw portions 62c are respectively removed from the edges of the engaged portions 40k1 and 40k2. The attachment 60 can then be carried away and removed from the docking station 2.

Furthermore, in the first embodiment, as an example, as the attachment 60 is brought closer to the docking station 2 in a manner keeping the engaged portions 40m1 and 40m2 of the docking station 2 corresponding to (facing) the respective engaged portions 60u1 and 60u2 of the attachment 60, the engaged portions 60u1 and 60u2 of the attachment 60 are respectively inserted into the engaged portions 40m1 and 40m2 of the docking station 2. On the contrary, when the attachment 60 is carried away from the docking station 2, the engaged portions 60u1 and 60u2 on the attachment 60 are removed from the respective engaged portions 40m1 and 40m2 of the docking station 2.

Figure 25:
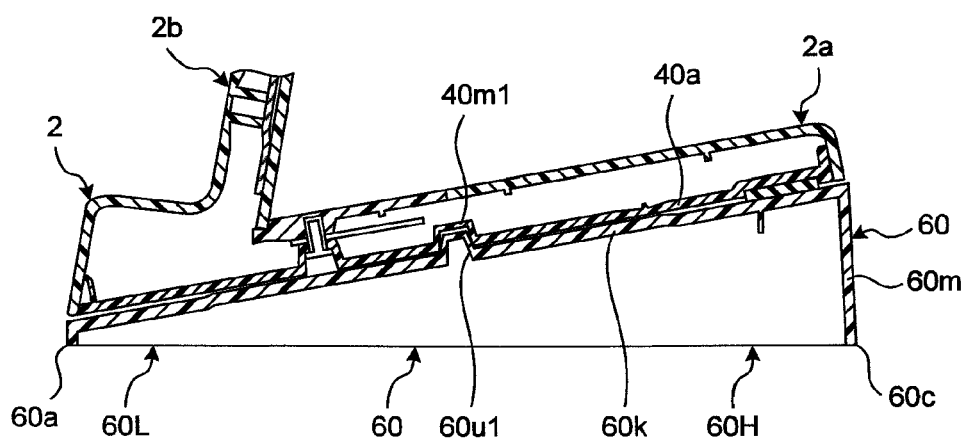
FIG. 25 is an exemplary cross sectional view of a portion of the attachment attached to the docking station of FIG. 24, in the first embodiment.

In the first embodiment, as an example, as illustrated in FIGS. 22 and 23, the engaged portions 40k1 and 40k2 and the engaged portions 62a1 and 62a2 are configured in axial symmetry with respect to an axis Ax perpendicularly crossing the bottom part of the docking station 2 (an axis perpendicularly crossing the setting surface P when the docking station 2 is placed on the setting surface P that is a flat surface), and are configured so that the engaged portions 40k1 and 40k2 of the docking station 2 can be engaged with the respective engaged portions 62a1 and 62a2 of the attachment 60 even when the attachment 60 is rotated by 180 degrees about the axis Ax with respect to the docking station 2. As illustrated in FIGS. 22 and 23, the engaged portions 40m1 and 40m2 and the engaged portions 60u1 and 60u2 are also arranged in axial symmetry with the axis Ax perpendicularly crossing the bottom part of the docking station 2 (the axis perpendicularly crossing the setting surface P when the docking station 2 is placed on the setting surface P that is a flat surface) so that the engaged portions 40m1 and 40m2 of the docking station 2 can be engaged with the respective engaged portions 60u1 and 60u2 of the attachment 60 even when the attachment 60 is rotated by 180 degrees about the axis Ax with respect to the docking station 2. Therefore, in the first embodiment, as an example, by changing the posture of the attachment 60 and attaching the attachment 60 to the docking station 2, it is possible to obtain an arrangement in which the engaged portion 40k1 is engaged with the engaged portion 62a1, the engaged portion 40k2 is engaged with the engaged portion 62a2, the engaged portion 40m1 is engaged with the engaged portion 60u1, and the engaged portion 40m2 is engaged with the engaged portion 60u2 (the arrangement illustrated in FIGS. 24 and 25), and an arrangement in which the engaged portion 40k1 is engaged with the engaged portion 62a2, the engaged portion 40k2 is engaged with the engaged portion 62a1, the engaged portion 40m2 is engaged with the engaged portion 60u1, and the engaged portion 40m1 is engaged with the engaged portion 60u2 (the arrangement illustrated in FIGS. 26 and 27). The axis Ax is laid at the center of the front-back directions of the docking station 2 and of the attachment 60, as an example. In this manner, as an example, even if the posture (orientation) of the attachment 60 is changed, a change in the positional relationship between the end 40c and the end 40e respectively disposed on the front side and the rear side of the docking station 2 and the end 60a and the end 60c respectively disposed on the front side and the rear side of the attachment 60 can be reduced. Therefore, as an example, the docking station 2 can be prevented from being misaligned with the attachment 60 depending on the posture of the attachment 60.

Figure 26:
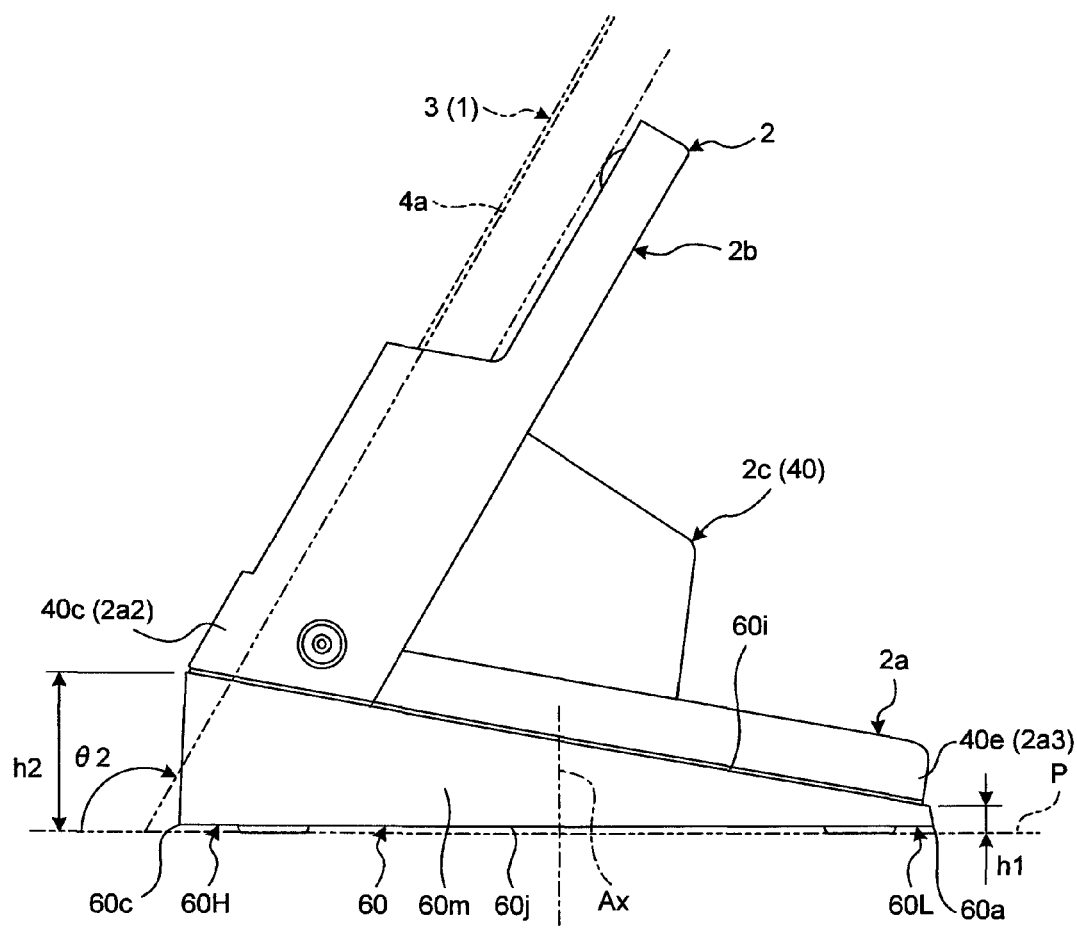
FIG. 26 is an exemplary side view of a state in which the attachment is attached to the docking station in another posture, in the first embodiment.
Figure 27:
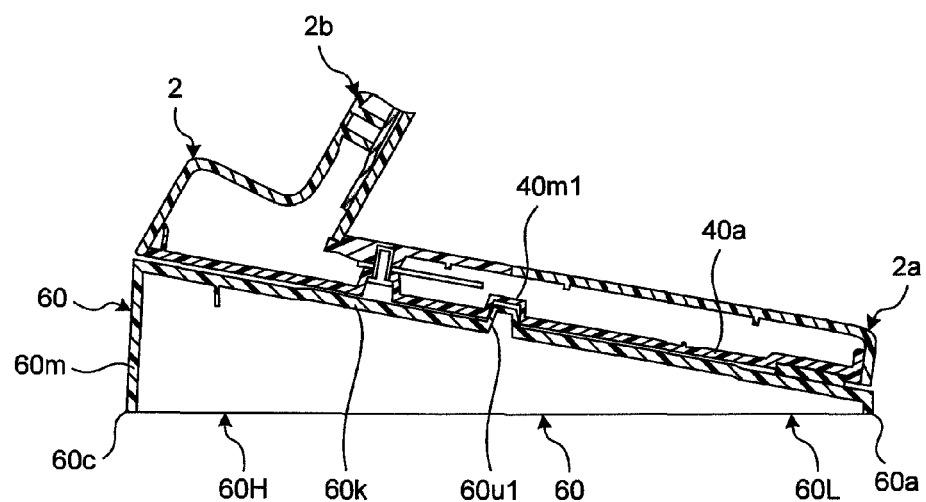
FIG. 27 is an exemplary cross sectional view of a portion of the attachment attached to the docking station of FIG. 26, in the first embodiment.

As described above, in the first embodiment, as an example, the attachment 60 comprises the first section 60L having a smaller height (lower than the second section 60H) and the second section 60H having a larger height (higher than the first section 60L). Therefore, as illustrated in FIGS. 24 to 27, by rotating the attachment 60 by 180 degrees on the setting surface P, thus changing (reversing) the orientation (posture, position) of the attachment 60, and attaching the attachment 60 to the docking station 2 at that position, the inclination angle of the second support 2b of the docking station 2, as well as the angle of the display screen 4a of the television receiver (electronic device) 1 held by the docking station 2 can be changed (set variably). In the arrangement illustrated in FIGS. 24 and 25 (first posture), the first section 60L having the first height h1 comes to the front side with respect to the second section 60H having the second height h2, and, in the arrangement illustrated in FIGS. 26 and 27 (second posture), the second section 60H having the second height h2 comes to the front side with respect to the first section 60L having the first height h1. In the first embodiment, as an example, such a structure enables the angle of the display screen 4a to be set variably (within the range of equal to or more than 90 degrees and less than 135 degrees in all of these arrangements) in three ways: an arrangement where the attachment 60 is attached in the first posture (first position); an arrangement where the attachment 60 is not attached; and an arrangement where the attachment 60 is attached in the second posture (second position). In the first embodiment, as an example, an angle θ1 of the display screen 4a in the more upright posture (first posture) illustrated in FIGS. 24 and 25, an angle θ3 of the display screen 4a without attaching the attachment 60 to the docking station 2, and an angle θ2 of the display screen 4a in the more laid-back posture (second posture) illustrated in FIGS. 26 and 27 are all equal to or more than 90 degrees and less than 135 degrees, as an example. 0 degree is an angle at which the normal direction of the display screen 4a is laid in the opposite direction of the normal direction of the setting surface P. 180 degrees is an angle at which the normal direction of the display screen 4a is matched with the normal direction of the setting surface P. When a user sees the standing display screen 4a, the display screen 4a is hardly used at an angle equal to or more than 135 degrees. Furthermore, the attachment 60 that is capable of being set at an angle equal to or more than 135 degrees tends to occupy more space. Therefore, in the first embodiment, as an example, the angle of the display screen 4a of the television receiver 1 held by the docking station 2 is set to an angle equal to or more than 90 degrees and less than 135 degrees. Furthermore, in the first embodiment, as an example, as illustrated in FIG. 5, the angle of the display screen 4a of the television receiver (electronic device) 1 placed on the setting surface P, without using the docking station 2, is equal to or more than 135 degrees and less than 180 degrees. This angle (posture) is an angle (posture) that is easy to use when the television receiver (electronic device) 1 is used in a manner placed on the setting surface P (easy to see the display screen 4a and easy to make operations on the touch panel).

As explained above, in the first embodiment, as an example, the docking station 2 for the television receiver 1 that is an example of the electronic device comprises the attachment 60 that is an example of an protruding portion that enables the angle of the display screen 4a of the television receiver 1 to be set variably. Therefore, according to the first embodiment, as an example, by attaching the attachment 60, the angle of the display screen 4a can be changed relatively easily. Furthermore, as an example, when the angle of the display screen 4a does not need to be set, attachment of the attachment 60 can be omitted. Therefore, a waste can be eliminated.

Furthermore, in the first embodiment, as an example, the attachment 60 can be attached to and removed from the first support 2a of the docking station 2. Therefore, according to the first embodiment, as an example, the angle of the display screen 4a can be changed relatively easily between the arrangements where the attachment 60 is attached and is not attached.

Furthermore, in the first embodiment, as an example, the attachment 60 can be connected to the first support 2a of the docking station 2 in the first posture in which the angle of the display screen 4a with respect to the setting surface P that is a horizontal surface is the first angle θ1, and the second posture in which the angle of the display screen 4a with respect to the setting surface P is the second angle θ2. Therefore, according to the first embodiment, as an example, by changing the posture in which the attachment 60 is attached, the angle of the display screen 4a can be changed relatively easily.

Furthermore, in the first embodiment, as an example, the attachment 60 comprises the first section 60L having the first height h1 and on which the first support 2a is placed, and the second section 60H located opposite side of the first section 60L, having the second height h2, and on which the first support 2a is placed. At the first posture, the first section 60L comes to the front side of the second section 60H. At the second posture, the second section 60H comes to the front side of the first section 60L. Therefore, according to the first embodiment, as an example, by changing the posture in which the attachment 60 is attached, the attachment 60 for enabling the angle of the display screen 4a to be changed can be obtained in a relatively simple structure.

Furthermore, in the first embodiment, as an example, in the first posture, the engaged portions 40k1 and 40k2 and the engaged portions 40m1 and 40m2 that are examples of the first engaged portions are respectively engaged with the engaged portions 62a1 and 62a2 and the engaged portions 60u1 and 60u2 that are examples of the second engaged portions. In the second posture, the engaged portions 40k1 and 40k2 and the engaged portions 40m1 and 40m2 are respectively engaged with the engaged portion 62a2 and 62a1 and the engaged portions 60u2 and 60u1 that are other examples of the second engaged portions. Therefore, according to the first embodiment, as an example, the engaged portions 40k1 and 40k2 and the engaged portions 40m1 and 40m2 that are example of the first engaged portions, and the engaged portions 62a1 and 62a2 and the engaged portions 60u1 and 60u2 that are examples of the second engaged portions can be used more efficiently in these two types of posture. In other words, the structure can be simplified compared with a structure in which separate engaged portions are provided for each of these types of posture.

Furthermore, in the first embodiment, as an example, the connector 43 that is an example of a second connector is supported on the first support 2a of the docking station 2 in a displaceable manner. Therefore, according to the first embodiment, as an example, the misalignment between the connector 19 and the connector 43, caused by the dimensional tolerance or a positioning error caused in mounting the television receiver 1 on the docking station 2, can be absorbed better, and as an example, the connector 19 and the connector 43 can be coupled more securely or more easily.

Furthermore, in the first embodiment, as an example, when the television receiver 1 is placed on the setting surface P that is an example of the horizontal surface in posture where the display screen 4a faces upwardly of the setting surface P, the television receiver 1 is titled by a larger degree that those in the first posture and the second posture where the television receiver 1 is supported by the docking station 2 (and the attachment 60), and the display screen 4a is inclined with respect to the setting surface P that is an example of the horizontal surface. In other words, as an example, the first angle θ1 and the second angle θ2 are equal to or more than 90 degrees and less than 135 degrees. In addition, the angle of the display screen 4a with respect to the setting surface P is equal to or more than 135 degrees and less than 180 degrees when the television receiver 1 is placed on the setting surface P in posture where the display screen 4a faces upwardly of the setting surface P, and the display screen 4a is inclined with respect to the setting surface P. Therefore, according to the first embodiment, as an example, by removing the television receiver 1 from the docking station 2 and placing on the setting surface P, another angle of the display screen 4a can be obtained. Furthermore, because the angle of the display screen 4a is inclined by an angle of equal to or more than 135 degrees and less than 180 degrees, as an example, compared with an arrangement in which the angle of the display screen 4a is 180 degrees and is not inclined, a user can see the display screen 4a easily. In addition, as explained in the first embodiment, as an example, when the input operation panel 5 is placed in a manner covering the display screen 4a, a user can make operations on the input operation panel 5 easily (can perform input operations easily).

A second embodiment is different from the first embodiment in that a television system (electronic device system) 100A comprises, as the protruding portion, foot portions 60A that are movably supported on a docking station 2A, instead of the attachment 60. The second embodiment is the same as the first embodiment in that the angle of the display screen 4a of a television receiver 1A (electronic device) supported by the docking station 2A is changed by changing the posture (position) of the foot portions 60A that are protruding portions. Therefore, in the second embodiment as well, the same advantageous effects can be achieved as those in the first embodiment.

Figure 28:
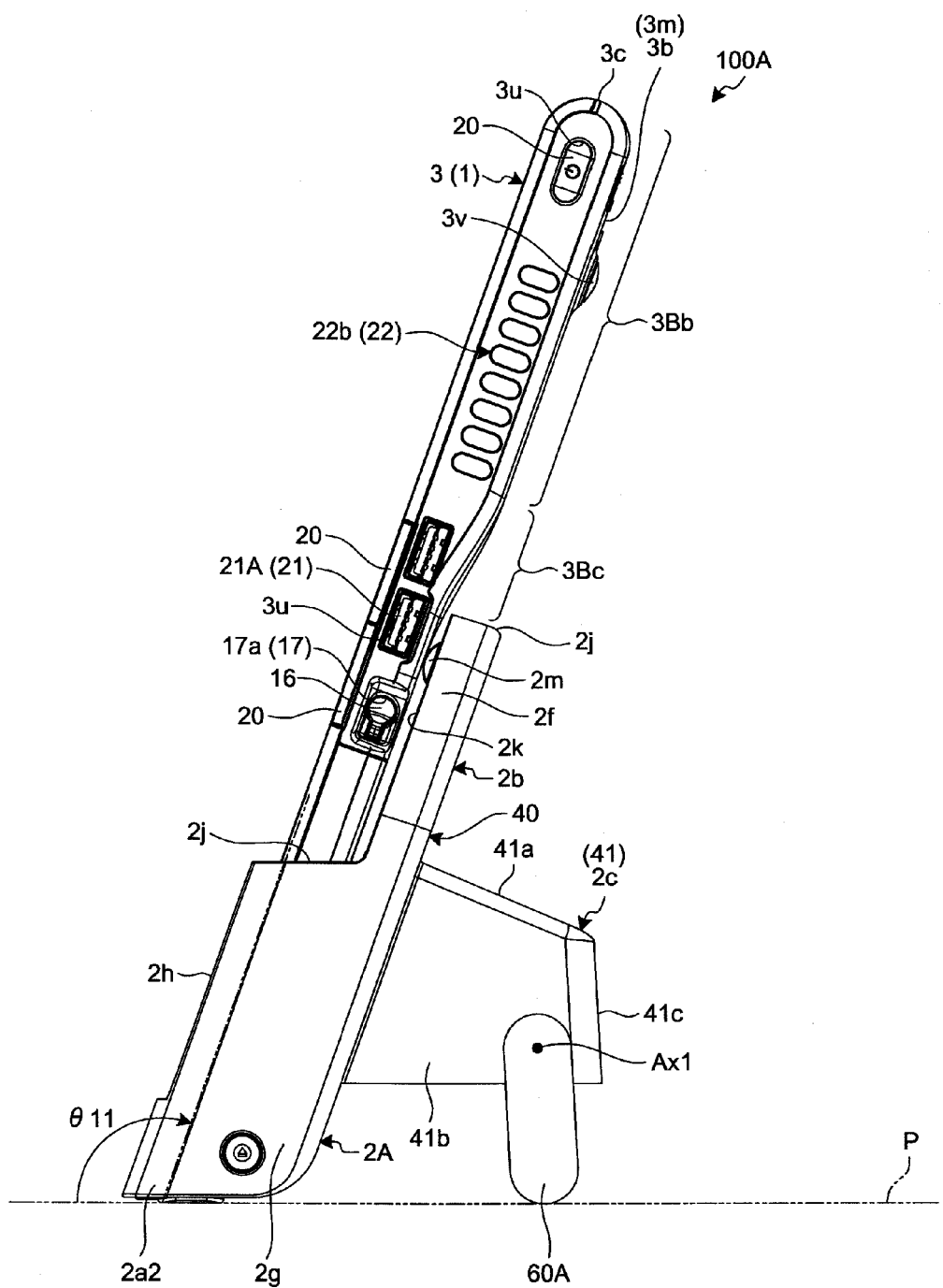
FIG. 28 is an exemplary side view of a state in which a television receiver is held by a docking station according to a second embodiment.
Figure 29:
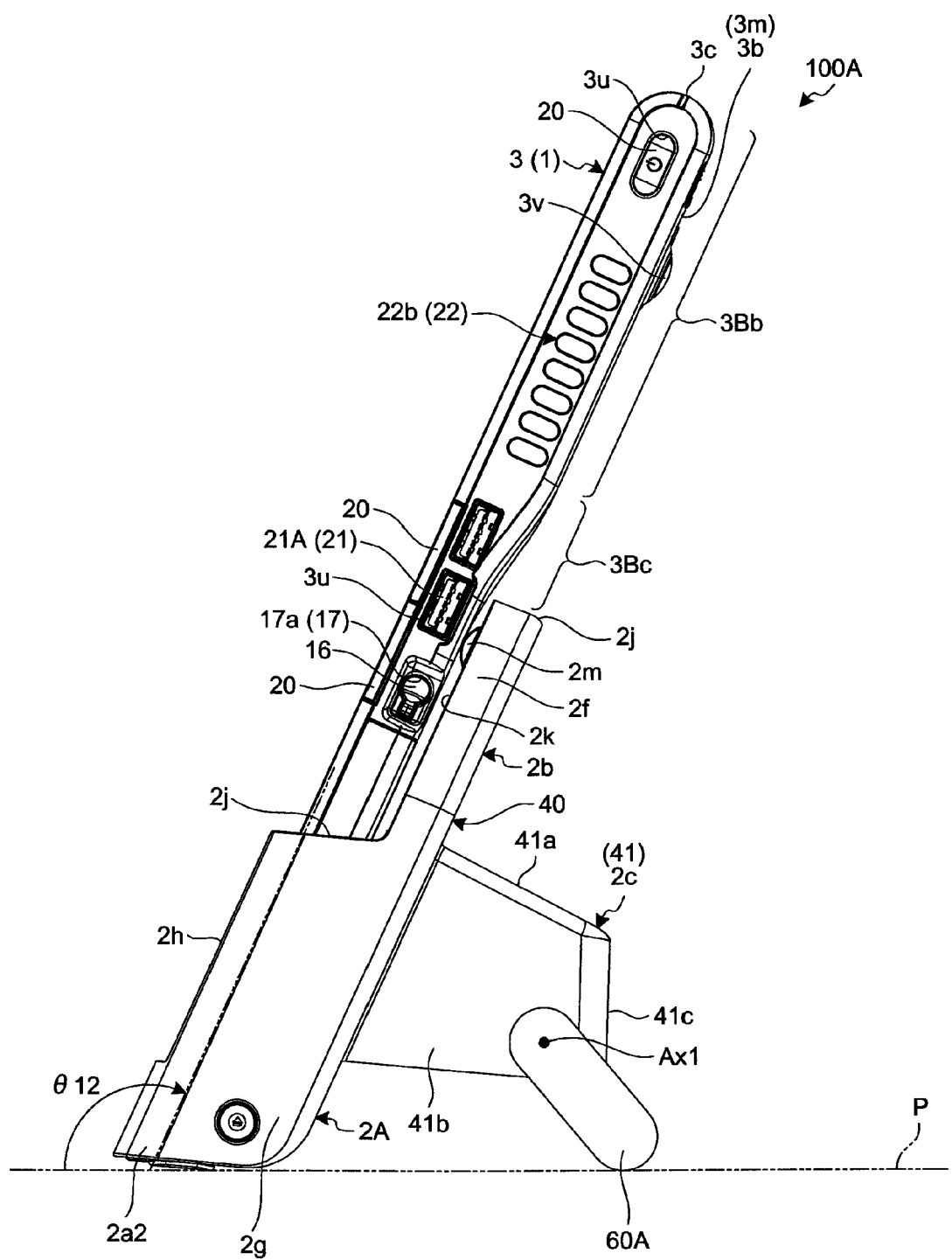
FIG. 29 is an exemplary side view of another state in which the television receiver is held by the docking station in the second embodiment.

In this embodiment, as an example, as illustrated in FIGS. 28 and 29, the docking station 2A comprises the second support 2b that is the same one as that according to the first embodiment. However, in this embodiment, the docking station 2A does not have the first support 2a. Furthermore, the protruding portion 2c is disposed in a manner separated above from the bottom end of the second support 2b. In the second embodiment as well, the protruding portion 2c is also the component housing 41 in the same manner as in the first embodiment. The foot portions 60A are disposed on the component housing 41 (the housing 40). As illustrated in FIGS. 28 and 29, the foot portions 60A are disposed on the wall portions 41b, the wall portion 41c, or a wall portion 41f of the component housing 41 (the housing 40) (in this embodiment, the wall portions 41b, as an example) in a rotatable (movable, displaceable) manner. Each of the foot portions 60A is rotatable (movable, displaceable) about a rotation axis Ax1 extending in a horizontal direction and the right-and-left direction when the display screen 4a is viewed from the front side (or viewed from the rear side). The foot portions 60A can be fixed at a plurality of positions (angles, at the positions illustrated in FIGS. 28 and 29, for example). As a mechanism (not illustrated) for fixing the foot portions 60A to the component housing 41 (the housing 40), various mechanisms and various techniques, such as a snap fit mechanism, a latch mechanism, a fastener, and a friction mechanism, can be used. In the second embodiment, when the foot portions 60A are projected further toward the rear side (toward the right side in FIGS. 28 and 29), as an example, the display screen 4a is inclined more (inclined further to the backward direction) (angle: θ11, θ12, θ12>θ11). According to the second embodiment as well, the angle of the display screen 4a can be set variably.

Figure 30:
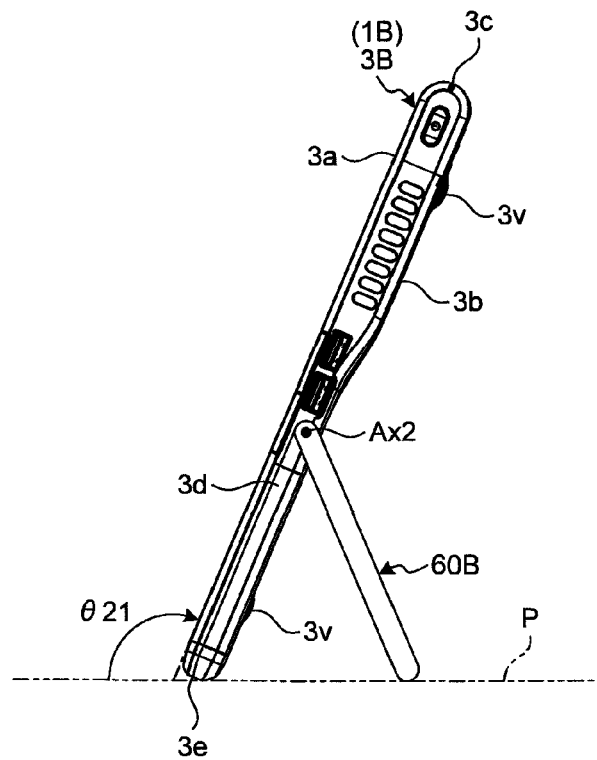
FIG. 30 is an exemplary side view of a state in which a television receiver is kept at a standing position, according to a third embodiment.
Figure 31:
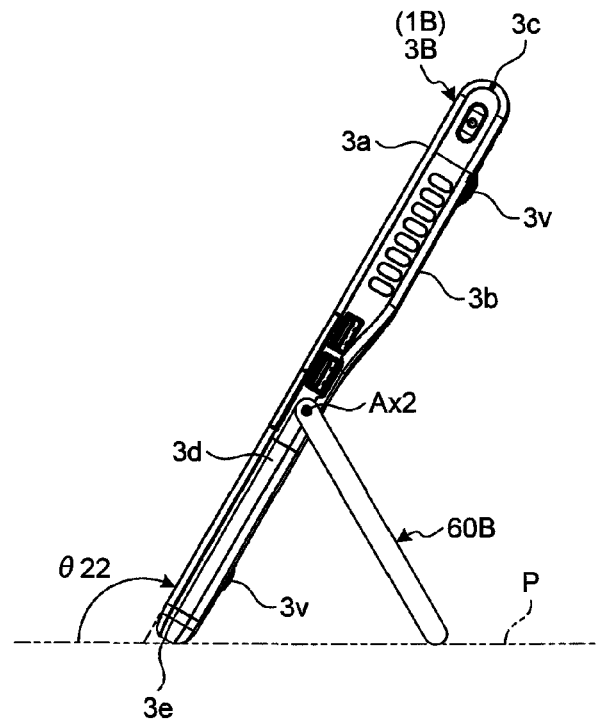
FIG. 31 is an exemplary side view of another state in which the television receiver is kept at another standing position, in the third embodiment.

A third embodiment is different from the first and the second embodiments in that, as the protruding portions, foot portions 60B are supported movably on a housing 3B of an electronic device 1B. The third embodiment is the same as the first and the second embodiments in that the angle of the display screen 4a of the television receiver (electronic device) 1 is changed by changing the posture (position) of the foot portions 60B that are the protruding portions. Therefore, in the third embodiment as well, the same advantageous effects as those in the first embodiment can be achieved. In the third embodiment as well, each of the foot portions 60B is rotatable (movable, displaceable) about a rotation axis Ax2 extending in a horizontal direction and the right-and-left direction when the display screen 4a is viewed from the front side (or viewed from the rear side). The foot portions 60B can be fixed at a plurality of positions (angles, the positions illustrated in FIGS. 30 and 31, for example). As a mechanism (not illustrated) for fixing the foot portions 60B to the housing 3B, various mechanisms and various techniques, such as a snap fit mechanism, a latch mechanism, a fastener, and a friction mechanism, can be used. Furthermore, in the third embodiment as well, when the foot portions 60B are projected further toward the rear side (toward the right in FIGS. 30 and 31), as an example, the display screen 4a is inclined more (inclined further to the backward direction) (angle: θ21, θ22, θ22>θ21). According to the third embodiment as well, the angle of the display screen 4a can be set variably. In the third embodiment, as an example, the foot portions 60B are fitted into (are brought into contact with, abut against) the housing 3B. This structure enables the electronic device 1B to be used in the same types of posture (angles) as those according to the first embodiment illustrated in FIG. 5.

While certain embodiments have been described above, these embodiments have been presented by way of example only and are not intended to limit to the scope of the inventions, and various modifications are still possible. For example, the docking station may be configured as a stand not having any connector as one of characteristics of an embodiment. Furthermore, the forms (appearances) of the electronic device, the docking station, the attachment, and the like may be changed and implemented in various ways as long as the angle of the display screen can be set variably. As an example, the attachment may have a structure having at least two points that can support the docking station. Furthermore, the technical characteristics of each of the embodiments may be implemented in a manner combined as appropriate. Furthermore, the specifications of (e.g., structure, type, direction, form, size, length, width, thickness, height, number, arrangement, position, and material) can be changed and realized as appropriate.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A docking station for an electronic device, the docking station comprising:
a support configured to support a housing to which a display device with a display screen is provided so that an electronic device comprising the housing is attachable and detachable with respect to the support; and
an attachment member configured to be attachable and detachable with respect to the support, wherein,
in a state in which the attachment member is in a first posture and is attached to the support, while the attachment member abuts on a setting surface and is placed on the setting surface, the electronic device is capable of being supported in a state in which an angle between the display screen and the setting surface is a first angle,
in a state in which the attachment member is in a second posture and is attached to the support, while the attachment member abuts on the setting surface and is placed on the setting surface, the electronic device is capable of being supported in a state in which an angle between the display screen and the setting surface is a second angle, and
in a state in which the attachment member is detached from the support, while the support abuts on the setting surface and is placed on the setting surface, the electronic device is capable of being supported in a state in which an angle between the setting surface and the display screen is a third angle,
each of the first angle, the second angle, and the third angle is an angle at which the display screen is inclined backwardly toward a rear face side of the display screen as the display screen is positioned farther away from the setting surface,
the first angle is an angle at which the display screen is positioned more toward the front face side of the display screen than at the third angle, and
the second angle is an angle at which the display screen is positioned more toward the rear face side of the display screen than at the third angle.

2. The docking station of claim 1, wherein
the attachment member comprises a first section with a first height and a second section with a second height, the second section is arranged on an opposite side of the first section, the support is configured to be placed on the first section and the second section, and
the first section is configured to be positioned on one side with respect to the second section in the first posture, and the second section is configured to be positioned on the one side with respect to the first section in the second posture.

3. The docking station of claim 2, further comprising:
a plurality of first engage portions, the support comprising the first engage portions; and
a plurality of second engage portions configured to engage with respective first engage portions, the attachment member comprising the second engage portions, wherein
one of the first engage portions is configured to engage with a first second engage portion in the first posture and is configured to engage with a different second engage portion in the second posture.

4. The docking station of claim 1, wherein, when the electronic device is placed on the setting surface in a posture in which the display screen faces upwardly from the setting surface, the display screen is tilted with respect to the setting surface by an angle larger than an angle of when the display screen is tilted with respect to the setting surface in the state in which the attachment member is in the first posture and the second posture.

5. The docking station of claim 1, wherein the attachment member is attachable and detachable with respect to the support by partial elastic deformation of the attachment member.

* * * * *